US011254485B2

(12) United States Patent
Tattam

(10) Patent No.: US 11,254,485 B2
(45) Date of Patent: Feb. 22, 2022

(54) INSULATING TRANSPORT AND STORAGE CONTAINER

(71) Applicant: SOFTBOX SYSTEMS LIMITED, Buckingham (GB)

(72) Inventor: Edwin Francis Tattam, Somerset (GB)

(73) Assignee: SOFTBOX SYSTEMS LIMITED, Buckingham (GB)

( * ) Notice: Subject to any disclaimer, the term of this patent is extended or adjusted under 35 U.S.C. 154(b) by 176 days.

(21) Appl. No.: 16/489,687

(22) PCT Filed: Feb. 28, 2018

(86) PCT No.: PCT/EP2018/025053
§ 371 (c)(1),
(2) Date: Oct. 28, 2019

(87) PCT Pub. No.: WO2018/157978
PCT Pub. Date: Sep. 7, 2018

(65) Prior Publication Data
US 2020/0262637 A1    Aug. 20, 2020

Related U.S. Application Data

(60) Provisional application No. 62/466,344, filed on Mar. 2, 2017.

(30) Foreign Application Priority Data

Feb. 28, 2017  (GB) ...................................... 1703266
Feb. 28, 2017  (GB) ...................................... 1703268

(51) Int. Cl.
*B65D 81/38*  (2006.01)
*B65D 5/12*  (2006.01)
(Continued)

(52) U.S. Cl.
CPC .......... *B65D 81/3823* (2013.01); *B65D 5/12* (2013.01); *F25D 3/08* (2013.01);
(Continued)

(58) Field of Classification Search
CPC ............... B65D 25/14; B65D 81/3823; B65D 81/3813; B65D 81/38; B65D 5/12;
(Continued)

(56) References Cited

U.S. PATENT DOCUMENTS 1,404,945 A * 1/1922 Epstein ...................... A63F 1/06
273/148 A
1,449,409 A * 3/1923 Hunt .................... B65D 81/386
229/103.11
(Continued)

FOREIGN PATENT DOCUMENTS

DE          1221557 B   * 7/1966  ............. B65D 67/02
DE       19644887 A1   * 4/1998  ....... A61F 13/55145
GB         980136 A   * 1/1965  ............... B65D 5/12

*Primary Examiner* — Robert J Hicks
(74) *Attorney, Agent, or Firm* — Galvin Patent Law LLC; Brian R. Galvin; Brian S. Boon

(57) ABSTRACT

An insulating transport/storage container for transporting/storing temperature sensitive materials, with a generally tubular wall element defining a load volume between first and second apertures at either end thereof, the tubular wall element having an axis. First and second closures operate to close first and second apertures and fastening means operable to secure said first and second closures. The tubular wall element comprises a multiple-layer winding of single-sided corrugated sheet, with the layers coupled together whereby to define a high level of thermal resistance.

20 Claims, 12 Drawing Sheets

(51) Int. Cl.
*F25D 3/08* (2006.01)
*B65D 3/22* (2006.01)

(52) U.S. Cl.
CPC .......... *B32B 2307/304* (2013.01); *B65D 3/22* (2013.01); *F25D 2303/0844* (2013.01); *F25D 2331/804* (2013.01)

(58) Field of Classification Search
CPC .......... B65D 5/22; B65D 5/2052; B65D 5/60; B65D 3/22; B65D 1/40; B65D 69/00; B65D 77/00; F25D 3/08; F25D 3/06; D21F 1/48
USPC .................. 220/592.26, 592.2, 62.11, 62.21; 229/939, 181, 103.3, 103.2, 103.11, 229/117.27, 117.29, 117.28; 206/226, 206/225, 223, 216
See application file for complete search history.

(56) References Cited

U.S. PATENT DOCUMENTS

| | | | | |
|---|---|---|---|---|
| 1,730,090 A * | 10/1929 | O'Brien | ............... | B65D 81/386 229/103.11 |
| 2,139,922 A * | 12/1938 | Irving | ................ | B29C 71/0009 428/167 |
| 2,169,318 A * | 8/1939 | Copeland | ............... | B42F 17/02 220/532 |
| 2,954,913 A * | 10/1960 | Rossman | ............ | B65D 81/386 229/103.11 |
| 3,399,546 A * | 9/1968 | Kuns | ..................... | A47F 3/0439 62/371 |
| 3,796,307 A * | 3/1974 | McKinney | .............. | B32B 29/08 206/497 |
| 4,601,407 A * | 7/1986 | Gillard | ................. | B65D 5/4266 229/125.19 |
| 4,623,072 A * | 11/1986 | Lorenz | ................. | B65D 5/4266 229/122.32 |
| 5,074,090 A * | 12/1991 | Hafers | .................. | E04B 2/7403 52/406.3 |
| 5,575,418 A * | 11/1996 | Wu | ........................ | A23B 7/148 229/5.81 |
| 5,897,017 A * | 4/1999 | Lantz | .................. | B65D 81/3823 220/592.1 |
| 6,055,825 A * | 5/2000 | Choy | ..................... | B65D 77/02 220/1.5 |
| 7,229,677 B2 * | 6/2007 | Miller | ....................... | B32B 3/28 428/34.2 |
| 2003/0102317 A1* | 6/2003 | Gordon | .............. | B65D 81/3823 220/592.2 |
| 2003/0217948 A1* | 11/2003 | Lantz | ................. | B65D 81/3862 206/591 |
| 2005/0205459 A1* | 9/2005 | Mogil | .................... | A45C 11/20 206/545 |
| 2005/0224501 A1* | 10/2005 | Folkert | ................ | B65D 81/386 220/592.2 |
| 2014/0144161 A1* | 5/2014 | Pointer | ................... | A61M 5/32 62/62 |
| 2017/0066582 A1* | 3/2017 | Vogel | ........................ | F25D 3/06 |
| 2017/0198959 A1* | 7/2017 | Morris | ................... | B65D 81/38 |
| 2017/0349356 A1* | 12/2017 | Dudi | ................... | B65D 81/3825 |

\* cited by examiner

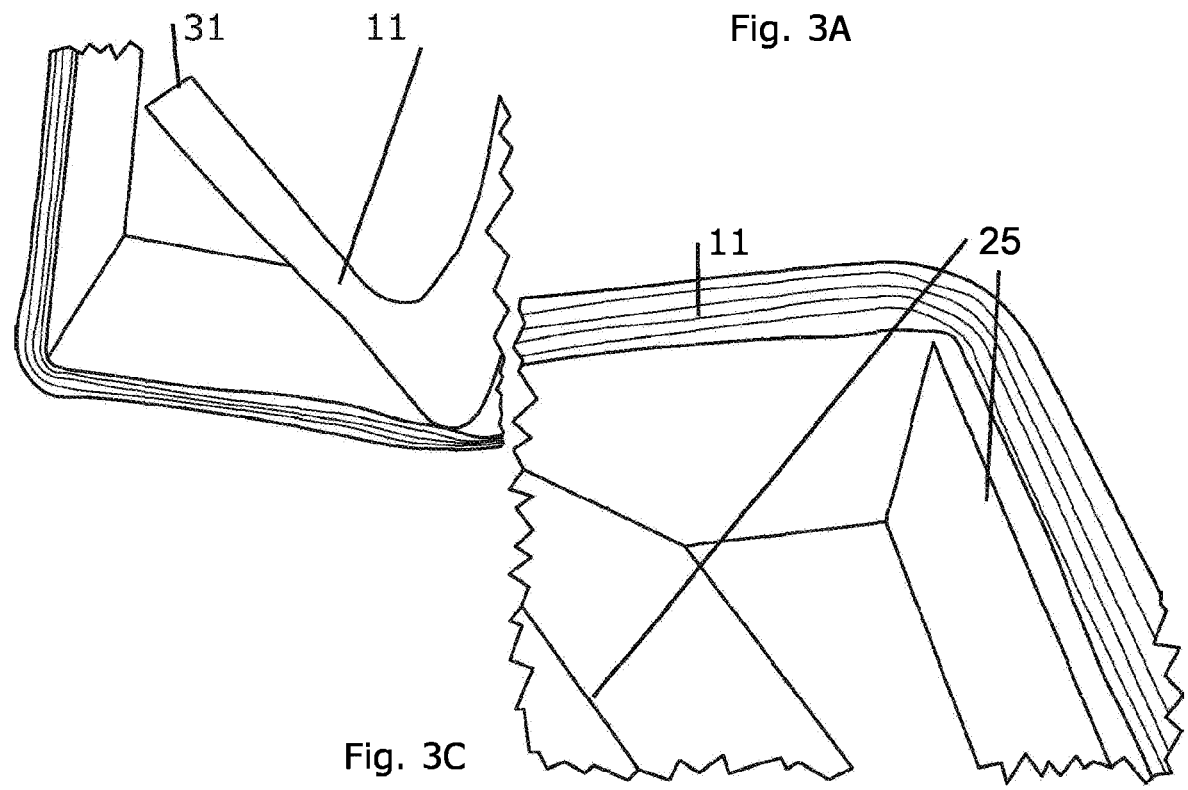
Fig. 3A
Fig. 3C
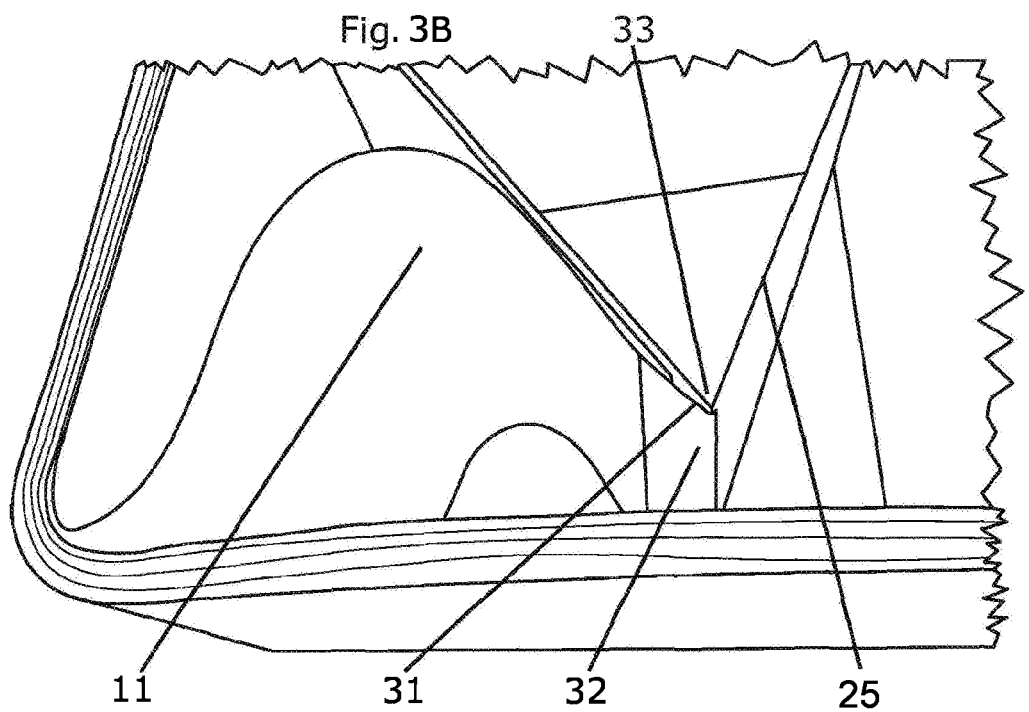
Fig. 3B

INSULATING TRANSPORT AND STORAGE CONTAINER

CROSS-REFERENCE TO RELATED APPLICATIONS

| application Ser. No. | Date Filed | Title |
|---|---|---|
| Current application | Herewith | AN INSULATING TRANSPORT AND STORAGE CONTAINER Is a National Phase Entry (371) filing of: |
| PCT/EP2018/ 025053 | Feb. 28, 2018 | AN INSULATING TRANSPORT AND STORAGE CONTAINER which is a PCT filing of, and claims benefit of, and priority to: |
| 62/466,344 | Mar. 2, 2017 | INSULATING TRANSPORT CONTAINER and is also a PCT filing of Great Britain application: |
| 1703266.5 | Feb. 28, 2017 | AN INSULATING TRANSPORT AND STORAGE CONTAINER and is also a PCT filing of Great Britain application: |
| 1703268.1 | Feb. 28, 2017 | AN INSULATING TRANSPORT AND STORAGE CONTAINER | the entire specification of each of which is incorporated herein by reference.

FIELD OF INVENTION

The present invention relates to the field of the transportation and storage of goods and, in particular, to a box or box-like transport container that can provide a high degree of thermal insulation. More particularly, the present invention relates to storage containers that comprise a box or box-like container that can be hand-held.

BACKGROUND TO THE INVENTION

In the field of logistics, that is the field of movement and supply of produce and materials, there is a widespread requirement to protect a thermally sensitive load to ensure that certain types of produce and materials do not meet or exceed through certain temperature thresholds. It is well known that, for example, vegetables when subject to extremes of temperature that they become flaccid, as the cell structure is broken down through the formation of icicles or through dehydration.

In essence, in any transport container with a thermally sensitive load, the rate at which heat passes through the packaging material of the transport container must not extend beyond a permitted temperature range for the product. Temperature control of thermally sensitive goods is particularly challenging when the thermally sensitive goods must be maintained within a narrow temperature range. Refrigeration units as used on certain trucks and containers require a source of electrical power or a fuel for a gas-powered air-conditioning/freezer unit and also require an atmosphere with which to exchange heat. Such refrigeration units not only occupy a volume, they cannot be used for small containers and individual boxes. Typical means for shipping temperature sensitive materials involves the use of an insulated box, with the necessary shipping and warning labels, along with some cooling agent. These cooling agents have typically been, for example, a frozen gel, dry ice, or water-based ice, placed within an insulator packing agent, such as cotton or, latterly, plastics materials such as expanded polystyrene foam, wherein heat is absorbed by such cooling agents.

Low-cost temperature control systems in the transport industry often rely upon a number of layers of plastics foam to retain an inside temperature subject to the thermal path to a transported product from an outside the outside to maintain ideal operating temperature, as disclosed in WO02085749 in the name of the present applicant. WO02085749 teaches of a transport container which comprises of a substantially rigid liner, with flexible plastics foam surrounding the liner, and two substantially rigid plugs insertable at either end inside the liner to retain the liner in a non-collapsed configuration whereby to hold transportable contents therein. Multilayer insulation (MLI) is, accordingly, the most common passive thermal control element used in transport. MLI seeks to prevent both heat losses to the environment and excessive heating from the environment. Low-cost temperature control in the transport industry relies upon MLI to retain an inside temperature subject to the thermal path to a transported product from an outside the outside to maintain ideal operating temperature. MLI can simply comprise layers of plastics foam. However, polyethylene foam is not rigid and necessitates an encasement or be otherwise supported by way of a secondary rigid element. Furthermore, there is an increasing emphasis on the use of products that can be readily be recycled. Whilst nearly all types of plastics can be recycled, however the extent to which they are recycled depends upon technical, economic and logistic factors. As a valuable and finite resource, the optimum recovery route for most plastic items at the 'end-of-life' is to be recycled, preferably into a product that can then be recycled again and so on. In the UK, for example, 3.7 million tonnes of plastics comprising surplus products or salvageable leftover materials in the UK was produced (WRAP, 2016 Plastics Market Situation Report Spring 2016) of which 29% is recycled and 59% is recovered. Notwithstanding the above, certain plastics materials such as most polystyrene products are not recycled due to the lack of incentive to invest in the compactors and logistical systems required. Equally, polyethylene, without special treatment, is not readily biodegradable, and thus accumulates in landfill etc. The quantity of post-consumer plastics recycled has increased every year since at least 1990, but rates lag far behind those of other items, such as newspaper (about 80%) and corrugated fibreboard (about 70%). Additionally, there is a generally perceived requirement for an interior is that it needs to have a low emittance. A commonly used sheet material for this layer is Mylar that is aluminized on one or both sides. The interiors layers can be thin compared to the outer layer to save weight. However, recycling of plastics materials can present problems.

It has been known to store goods which are sensitive to temperature in thermally insulated containers in which so-called cooling blocks are housed. One simple example of such a container is that used by homemakers to store and transport food, from a frozen food counter, to a household ice compartment. In this case, the interior of the thermal container need only be kept cool for a relatively short period of time. Conveniently, it is sufficient to freeze such a block to the necessary temperature prior to using the same. In their simplest form, the cooling blocks are filled solely with water, which when frozen has a high heat of fusion and consequently is able to maintain the food in a cool environment for a considerable period of time. The weight and volume of water employed, however can present a problem for transportation. Phase change material (PCM) placed within cooling blocks can provide alternative methods of temperature control.

Indeed, numerous insulated shipping containers have been developed over the years, and insulated shipping containers employing PCMs can be deployed for a wide range of thermally sensitive goods over a wide range of target temperatures by using different PCMs. For example, deuterium oxide melts at +4° C., water melts at 0° C., a 20% ethylene glycol solution melts at −8° C., castor oil melts at −10° C., neat ethylene glycol melts at −12.9° C., mineral oil melts at −30° C., and a 50% ethylene glycol solution melts at −37° C. This permits use of insulated shipping containers for a broad range of thermally labile goods.

Whilst these phase change systems can work well, they are relatively expensive to purchase and to operate. Furthermore, the phase change material suffers from not being particularly degradable, which issue is reflected in the use of conventional prior containers where polystyrene and polyethylene foams, as used for insulation, also do not degrade readily, leading to similar disposal problems.

Another alternative phase change coolant is dry ice, but this is classified as being potentially dangerous in view of the fact that carbon dioxide gas evolved during shipment can be dangerous to shipping personnel, necessitating the use of hazard warnings and, sometimes, the payment of additional fees. Additionally outright bans on dry ice are pending in several areas. Moreover, this can be inconvenient for many transport systems, notably for home delivery. Finally, ice which melts to water poses handling problems in packing, as well as leakage and product soaking problems.

The present-day world is a demanding world and everyone has busy schedule: time is precious and time is money. Currently, online shopping is a growing phenomenon in view of the saving of time and general convenience. It can be difficult for office workers, for example, to spare time to shop at malls and markets, which, if crowded can be uncomfortable and tiring at times. One of the most challenging sectors of the retail market today is the grocery segment, specifically e-grocers. Major players in the e-grocery landscape differentiate themselves by the types of products and services they offer, particularly, by their method of order fulfilment and delivery and by the geographical markets in which they operate.

A significant limiting factor in the e-grocery business, however, is the fact that generally, many ordinary grocery items are perishable, namely those goods that are not pantry items and need to be stored in a refrigerator or a freezer. This category includes products like fresh vegetables, dairy produce and meats. Given that a goal of these companies is to replace consumers' trips to the grocery store completely, there must be an economical provision of containers that have, ordinarily, a single use life expectancy that can extend the e-grocer's requirement to enable product selection to extend from non-perishables to perishables, given that transport and delivery must extend to protection from delivery temperature variation and to include being left outside in the mid-day sun prior to being picked up in the evening when members of a household return to pick-up the delivery box at the start of the driveway or positioned just off the sidewalk, in front of the house.

Additionally, given that city dwellers are less likely to have a personal vehicle, city-based customers often need to use public transportation for shopping. Having groceries delivered to their door rather than carrying them in crowded buses or subways is a big advantage. Presently, a number of e-grocery systems operate; first movers in the e-grocery/home delivery market have relied upon traditional plastics crates akin to shopping baskets and bags, that require customers to be present to receive goods; developing online supermarket systems package goods to enable unattended doorstep delivery, including pre-pared meals.

For parcel delivery systems, corrugated paper is typically employed. Whilst un-faced corrugated board is documented from Victorian England, when one of its initial uses was to provide stiffness and cushioning to men's tall hats, which had hitherto been stiffened by rolled sheets of flat paperboard—yet were fragile and subject to damage. Today, such material would be called "un-faced corrugated" or "un-faced corrugate". Notwithstanding this corrugated and paperboard packaging is typically—and erroneously—termed 'cardboard'. Single face corrugated sheet comprises a sheet of facing or liner material joined to corrugated medium, by the use of, typically—for wood-based sheet material—water based glue on the crests of flutes, the liner is brought into contact and can be heated to "set" the glue. Corrugated paper boxes are cheap to manufacture and have desirable qualities of recyclability and low thermal conductivity, but are typically moisture absorbent. Corrugated plastics sheet can be extruded in a simple process to make plastic sheet analogues of corrugated paper. In the delivery of temperature sensitive goods plastics such as expanded polystyrene is typically employed.

Coiling paper cushioning is one way of making sure that your goods arrive intact. This technique's main advantage is that packing material is kept to a minimum as the coils of paper cushioning allow an area of space that does not need to be filled. Twisting can be an effective way of making sure that your product is snuggly positioned with the correct pressure inside of your package. Making sure that you minimise the movement of goods in transit is essential to safe transportation and will reduce breakages. Crossing lengths of cushioned paper can also be an effective way of packing multiple products safely in a carton. Once the goods have been safely packaged within a box carton, there will be a slight resistance when closing the carton flaps and sealing, to ensure that a correct pressure is applied to keep the items in relative position. However, the very nature of randomly wrapping will provide poor thermal insulation since there will be gaps in the twisted paper wrap.

In addition to online groceries, there are a number of companies which provide an ingredient-and-recipe meal kit service, where home-delivered boxes contain ingredients and recipes that must be cooked by hand by a customer using the pre-ordered ingredients. Meal kit companies have been criticized for creating excess packaging waste from the individually packaged ingredients. Referring to FIGS. 1A and 1B, there is shown a first example of an insulated box, wherein horse hair, cotton, wool within a plastics bag is employed to insulate the goods from thermal change and shock. The bag is there to contain the horsehair etc. and to protect from random debris, fungus and vermin; one problem that arises is one of settling of the horsehair insulation, whereby, after movement during transportation, the effective insulation varies about the product which is intended to be maintained in a condition of uniform temperature—that it is to say it is not reliable and of consistent quality.

SUMMARY

The present invention seeks to provide a solution to the problems addressed above. The present invention seeks to provide a thermally stable container that can provide a simple passive arrangement for use with or without water, phase change materials can enable goods to reliably be maintained within a particular temperature range. The present invention also seeks to provide a temperature-controlled transport/storage assembly for goods palletised or otherwise, whereby goods can be maintained within an atmosphere having a predefined temperature range. The present invention also seeks to provide a temperature-controlled transport/storage assembly that can be made from recycled materials and be further re-used or recycled in due course.

STATEMENT OF INVENTION

In accordance with a general aspect of the invention, there is provided a thermally insulating transport/storage container for transporting/storing temperature sensitive materials.

Thus, in a first aspect, the present invention provides:

an insulating transport/storage container for transporting/storing temperature sensitive materials, the container comprising:

a generally tubular wall element defining a load volume between first and second apertures at either end thereof, the tubular wall element having an axis; first and second closures operable to close first and second apertures; and, fastening means operable to secure said first and second closures;

wherein the tubular wall element comprises a multiple-layer winding of single-sided corrugated sheet, with the layers coupled together whereby to define a high level of thermal resistance; and, wherein, upon securement by way of the fastening means, the closures are brought together with respect to the tubular wall element at the ends thereof about mutually contacting areas.

The first and second closures provided have an equivalent level of thermal resistance to the tubular wall element whereby to provide an equivalent level of thermal resistance about said mutually contacting areas. The fastening means can comprise one or more of: adhesive tape, tensioned straps, shrink-wrap plastics film, a frame, and a box, wherein the fastening means is operable to ensure that the closure elements fit closely to/abut with the tubular wall element. The present invention thus provides a simple to manufacture self-supporting tubular arrangement of corrugated material to provide a container with very high insulation properties—both in a thermal sense and mechanical shock sense. It will be appreciated that such a container can be employed in door-step delivery systems. Data tracking systems could be employed to provide advice of delivery and with regard to security.

The closure elements or end caps can define a frusto-conical plug which are operable to fit in an interference fashion with an inside surface of the respective ends of the tubular wall section. In one embodiment, at least one of the first and second closures caps is arranged to closely abut the flutes of the respective first and second ends of the tubular element. This has the advantage of ensuring that gaseous transfer from outside of the container to within the flutes is effectively non-existent; whilst adhesive tape or similar could also be provided about the edges defining the aperture either end of the tubular cylinder, the walls of the container would be less amenable to being compressed for storage or otherwise.

Preferably, at least one of the first and second closures are arranged such said respective closure comprises a first, inner part that has a section that corresponds with an inside section of the tubular wall element associated with one of the apertures and a second, outer part that has a profile that is arranged to provide thermal insulating properties. This has an advantage in that the inside volume of the tube is positively defined. In another embodiment, at least one closure is arranged such that said second, outer part of said closure is arranged such that its section profile corresponds with an external section of the tubular wall element whereby to provide an equivalent thermal conductivity.

Conveniently, the corrugated sheet comprises a length, with the length extending orthogonally with respect to the flutes of the sheet. The use of corrugated sheet that is flexed orthogonally with respect to a flute direction of the container provides surprising thermal resistance when employed in a multi-layer scenario and incidentally provides considerable innate mechanical rigidity dispensing with the need of a former and, furthermore—importantly for a transport container—can absorb significant degrees of mishandling.

The corrugated sheet can be formed of cellulose wherein layers of sheet and fluted corrugations are glued or otherwise connected to each other. Equally, the corrugated sheet can be formed of a thermo-plastics material, such as polypropylene, which is manufactured in an extruded form. A benefit of the corrugated sheet being single sided corrugated sheet is that conformity with edge features and/or curves of a general shape defined by the container are simply realized. This is of particular benefit in the case of extruded plastics such as polyethylene, which is more difficult to bend in a direction orthogonal to the direction of the corrugated flutes.

The present invention may be arranged such that the flutes are directed inwardly, wherein a plain liner sheet may be provided to ensure complete sealing with the closure members, although cellulose based products such as crepe paper or rubber seals may instead be provided as gaskets, to eliminate passage of air as between the bung and an inside wall of the container. Equally, for the purposes of interpretation, single-sided corrugate is intended to cover corrugate materials having twin sheets, of which one is of a poor strength sheet, such as a test sheet, being provided merely for closure of the fluting, to provide thermal retention benefits and readily permits bending of the board in a concave fashion with respect to the surface of the flexible, test sheet.

The present invention in a basic form thus comprises of three components that are required to be fastened together by adhesive tape, adhesive glue, shrink-wrap or be arranged together and then placed within a box having a depth (or width) corresponding to the axial length of the walls and any length associated with the bungs beyond the axial dimensions of the wall. The present invention when disassembled provides a compact, flat-packed assembly of a low specific volume for storage.

The present invention can provide a simple to manufacture, low-cost box for e-grocery businesses. Indeed, in a further embodiment, the coiled multi-layered corrugated sheet tubular wall member could be provided with two or more sections along its axial length where the number of layers of corrugated sheets in these two or more sections differ, whereby the R-value would vary along the axial length. This could provide an advantage in that, with regard to home delivery of grocery items, temperature sensitive products such as ices could be placed within a sub-zero compartment; whilst temperature sensitive salad produce is separated in a different temperature zone. Data tracking systems could be employed to provide advice of delivery and with regard to security; temperature sensors could be provided to indicate an inside temperature of the contents, to dissuade early opening of a grocery box.

The manufacture of the present invention can be as simple as cutting a roll of corrugated sheet material to a specific width and using such width of material in surrounding a former—which may be of numerous shapes; rectangular (including square, triangular and other polygons, realizing that the closure element in the form of a bung—which can be made from numerous materials in principle and needs to be of a corresponding dimension so as to provide a friction fit and have a similar conductivity value—can easily and simply be made of the same material as the walls of the container. The corrugated board can comprise a squashed roll of material and, once cut to the correct dimensions, be taped or adhesively secured in position. The closure element can comprise an insert part with external axial dimensions in general correspondence with the inside of the axial tube, which is conveniently attached, again by tape or adhesive to a second, external part that protrudes beyond the axial dimensions of the tubular member, which external member has a shape that extends to the external dimensions of the tubular member.

Notwithstanding the problems encountered by known systems which employ phase change materials for short-term use, it will be realised the present invention will also benefit in terms of duration of temperature control the use of phase change material temperature control packs that include one or more phase change materials, are contained in sealed containers can be provided to further increase a period of time within which temperature stability can be achieved. The sealed containers for phase change materials can be provided by one of a plastics bag, a blister pack, a sheet cellulose package, a sealed polymer enclosure. The temperature control packs can be configured to provide a defined thermally stable atmosphere within the payload volume for a number of days as is typical for international travel, for example.

In accordance with another aspect of the invention, there is provided a method of packing a product for shipment comprising the steps of:

a. obtaining a tubular container element and arranging the tube so as to define an axial tubular volume;

b. placing a first closure element at a first end of the tubular container element, such that an insert member is inserted within the tubular element without gaps as between an inside lining of the tube and the sides of the insert member;

c. placing product within tubular load volume;

d. placing a second closure element at a second end of the tubular container element, so as to close the tubular load volume; and e. fastening the tubular member with respect to the first and second members by the use of adhesive fastening means, such as tape (adhesive or otherwise), straps, adhesives, shrink wrap materials or placement within a large box being dimensioned to prevent axial movement/separation of the closure members with respect to the axial tube. By performing the operation within a room or area having a defined temperature, with products at the defined temperature or at a distinct separate temperature, a temperature of the load can be determined for a number of hours, given knowledge of anticipated temperatures outside of the container, as is known in the art of temperature-controlled logistics.

The method may be supplemented by the provision of a temperature control pack with, for example, one or more phase change materials whereby to enable a longer duration of temperature control, with regard to the size of the container, and expected ambient conditions.

The present invention can thus provide a simple to use, easy to handle box or box-like container solution that provides a collapsible container of high thermal and mechanical insulation. Importantly, in a simple, multi-use scenario, an easy to assemble container can readily be provided. Importantly, a substantial benefit, in a cellulose embodiment, is that the product is readily identifiable as a "green product", being made from natural resources and is readily decomposable. Notwithstanding this, when phase change materials are provided, the period of time in which temperature is maintained within a particular range can be substantially increased.

BRIEF DESCRIPTION OF THE FIGURES

For a better understanding of the present invention, reference will now be made, by way of example only, to the Figures as shown in the accompanying drawing sheets, wherein:—

FIGS. 3A-3C show three aspects of construction of the first embodiment of the invention;

DETAILED DESCRIPTION OF THE PREFERRED EMBODIMENTS

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 1A:
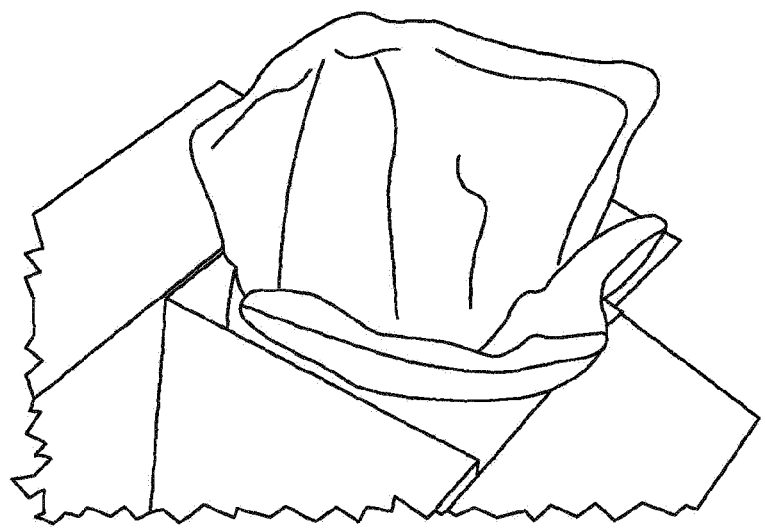
FIGS. 1A, 1B illustrate perspective views of a prior art storage and transport container.
Figure 1B:
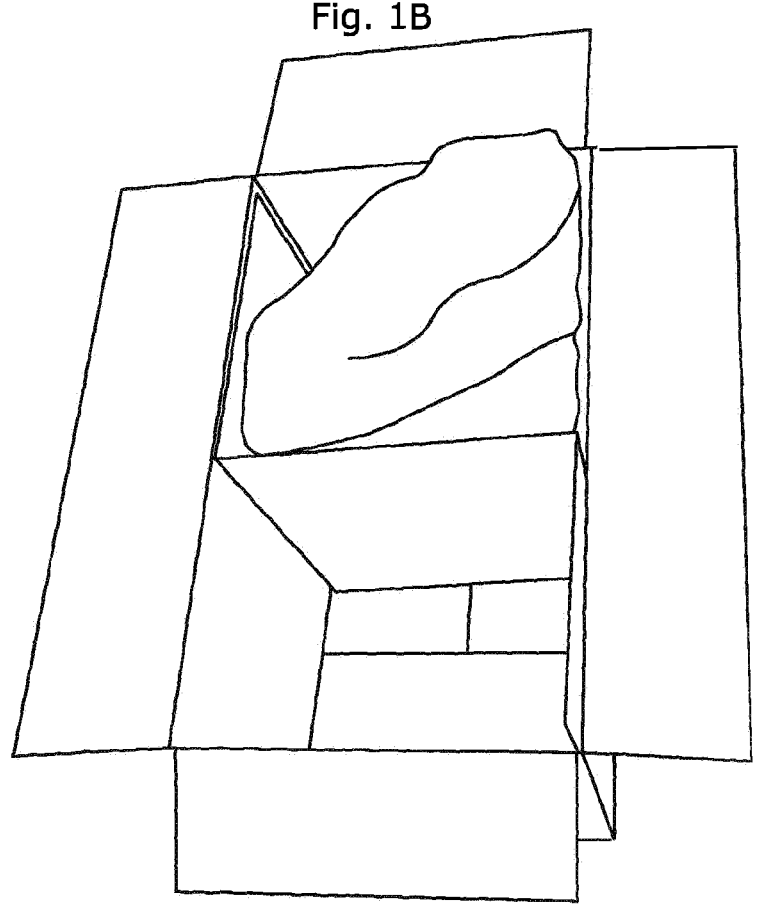
Figure 2A:
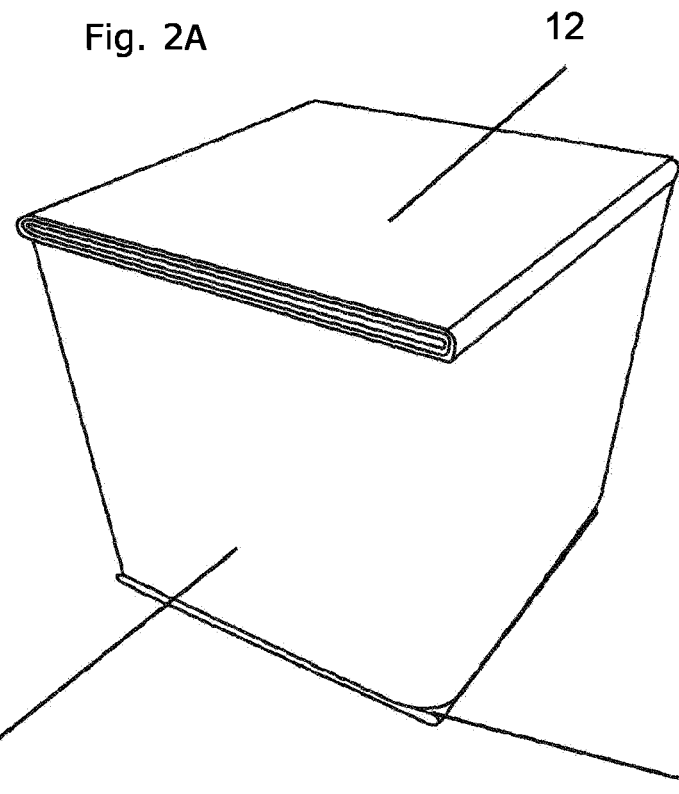
FIGS. 2A-2D illustrate a first embodiment of the invention.
Figure 2B:
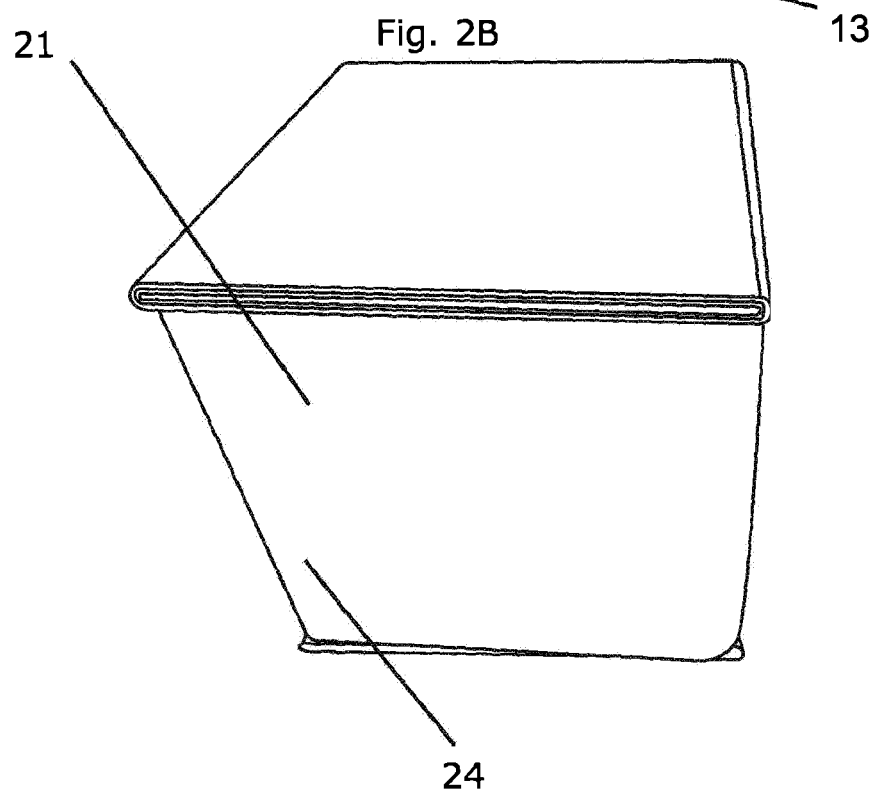

Referring to FIGS. 2A and 2B, there is shown a first aspect of an embodiment of the invention in perspective side and perspective front views. The embodiment 20 comprises a tubular wall member 21 comprised of wound single-sided corrugated material 11 and a liner 25, the tubular wall member defining an axis with first and second, upper and lower closure panels or bungs 22, 23 at opposite axial ends of the tubular wall member. The closure bungs each comprise an external component and an internal component; when fitted, the external component extends beyond the tubular wall member and the internal component lies within the tubular member, whereby to assist in maintenance of the shape of the tubular member. In an alternative embodiment, a closure or bung comprise a generally close-fitting planar sheet, where each closure or bung overlaps an axially directed edges of the sidewalls of the tubular wall member (noting that curviplanar sheets could be provided in principle). The first and second closure bungs each have a dimension orthogonal to the axis in general correspondence with a respective, planar external dimension of the respective tubular wall member and, likewise, each internal component has a dimension orthogonal to the axis in general correspondence with an internal dimension of the respective tubular wall member, whereby each bung prevents a passage of air as between the outside of the box and an interior thereof, by way of an interference fit. The interference fit may be enhanced by the external dimensions (in plan, i.e. orthogonal to the axis) of the axially innermost part of the internal part of the closure bung being reduced relative to the external dimension in plan of the interface zone of the internal part of the closure bung with respect to the external part of the closure bung, whereby to assist placement of the closure bung, when closing the container. In tests, it has been found that a gasket member comprising crepe paper can be employed to confirm such airtightness. It is to be noted that the first and second bungs may be shaped so that they dispense or substantially dispense with the external part of the closure bung, so that, for example, the external part comprises a thin sheet member, or merely comprise an insert section.

The upstanding walls of the container comprise spiral rolled single corrugated sheet, manufactured from plant cellulose or extruded plastics, with a single sheet to which are associated corrugate flutes, the flutes of the corrugations extending in general correspondence with the axial dimensions, whereby to provide excellent axial strength. The spiral roll of corrugation is conveniently formed by rolling corrugated sheet about a former, with a width of the corrugated sheet corresponding with the desired axial length of the tube to be created. The former can have a sectional shape in correspondence with the internal dimensions of the desired shape, be it a simple square or rectangular cylinder, an elliptical or circular cylinder. By shaping the spiral winding about a former, in the case of a shape having sharp angular changes about a corner, as in the case of a triangular former or other polygonal former, then the initial layer about the former benefits from the creation of well-defined creases, to assist in the subsequent insertion of a plug, when being assembled for use. It has been found that it is sufficient to apply liquid adhesive of a suitable type to engage with the material of the corrugated sheet in only a few strategic areas upon the outside of the first sheet of the roll whereby the subsequent spiral sheet becomes adhesively engaged.

Single sided corrugated material is also known as single face corrugate material and is not as widely used as double-sided board and is produced in reels with a re-winder either in the corrugator wet end line or as a specialist single facer group and re-winder off-line. The material is flexible in one direction, stiff in the other direction. Corrugated board is available in many different material grades with varying paper weights and finishes. Fluting is typically produced using waste and is known as waste-based fluting or can be made using semi-chemical fluting (80% hardwood, 20% softwood) Standard finishes include Kraft (brown), white and mottled, LT (recycled paper) and Test (recycled inner liner). White papers can be coated to provide superior substrate for greater print quality. Standard paper thickness starts at 125 gsm (grams per square meter) and increases to 150 gsm, 200 gsm and 300 gsm. Different flute weights are also available and depend on the strength of material required. Applicants have found that "E"-flute single sided board, which is 1.1-1.2 mm in thickness provides excellent crush resistance and compression strength, with the smooth surface of the un-fluted side providing a good surface for subsequent printing and samples for testing have been wound ten times. Wraparounds (also referred to as 'wraps') are designed for automated high-speed packing lines and provide tighter packing of a product than can be achieved with a standard box. Made from either corrugated or solid board, wraparounds can provide a more cost-effective solution than a regular box. The system can be manufactured them tailored to specific requirements to ensure that an ideal solution is achieved. Recycled fluting is available in the weight range 130-220 g/m$^2$ and can be used safely for various food packaging types. In addition to their superior print quality, they can be manufactured with perforations or tear strips so they can transform from a transit pack into a point-of-sale display within seconds. Wraparounds can be supplied in all board grades and flute combinations and can conveniently be manufactured bespoke to customers' requirements. A high-quality finish can easily be printed upon to enable optimum presentation to be achieved and can easily be formed by die cutting perforations and tear strips, whilst packaging machinery consultancy and expertise is widely available.

In a first alternative, adhesive tape can be applied so that it lies along an initial edge of the corrugated material, with half of the tape adhering to the edge; the other half to attach to the inside of the winding at the end of the first wind. Glue and tape may be used, as indeed may other fastening means including staples although the use of steel staples, for example, may compromise thermal characteristics. By applying adhesive to the leading and trailing edges of the roll and between layers, in selected places, the roll of corrugated material can retain its overall shape so that the closure elements can readily be placed inside or about the respective first and second apertures of the tube. In particular, with reference to FIG. 2B, adhesive tape 24 is shown. It would also be possible to apply a tape such as a plastics adhesive tape about the edges of the tube once a spiral wall structure has been created, although this would limit any lateral compressibility of the structure in a direction perpendicular to the axis of the tube, it would be beneficial in closing the exposed ends of the flutes as shall be discussed below.

For simplicity, it has been found that the former can be a plate with parallel edges about which the corrugated material can be wound. It has been found that this method provides two sharp edges, which is fine for a container having an elliptical section. In the case that the container has a polygonal section, then it will have a maximum of two edges properly defined. Accordingly, in the manufacture of polygonal containers, when using a flat plate, it has been found that the initial corrugated sheet layer ought to be creased about the edges of the plate (about both edges if the number (n) of sides is an odd number and the process is repeated for n/2 repeats) and about one edge if the number of sides is an odd number (about one edge if the number (N) of sides is an odd number and the process is repeated for N repeats) with the length of the corrugated sheet being moved by 360°/n (N) after the initial crease and then subsequently creased, until the appropriate number of creases have been formed. The closure elements can conveniently be manufactured from the same material, namely cellulose or extruded plastics corrugated sheeting, for ease of sourcing and simplicity in procedures. The closure elements, however can be made from a variety of different materials, but it will be appreciated that the R-value i.e. the rate of thermal transfer must be effectively equal (or better than) the R-value of the tubular element.

Figure 2C:
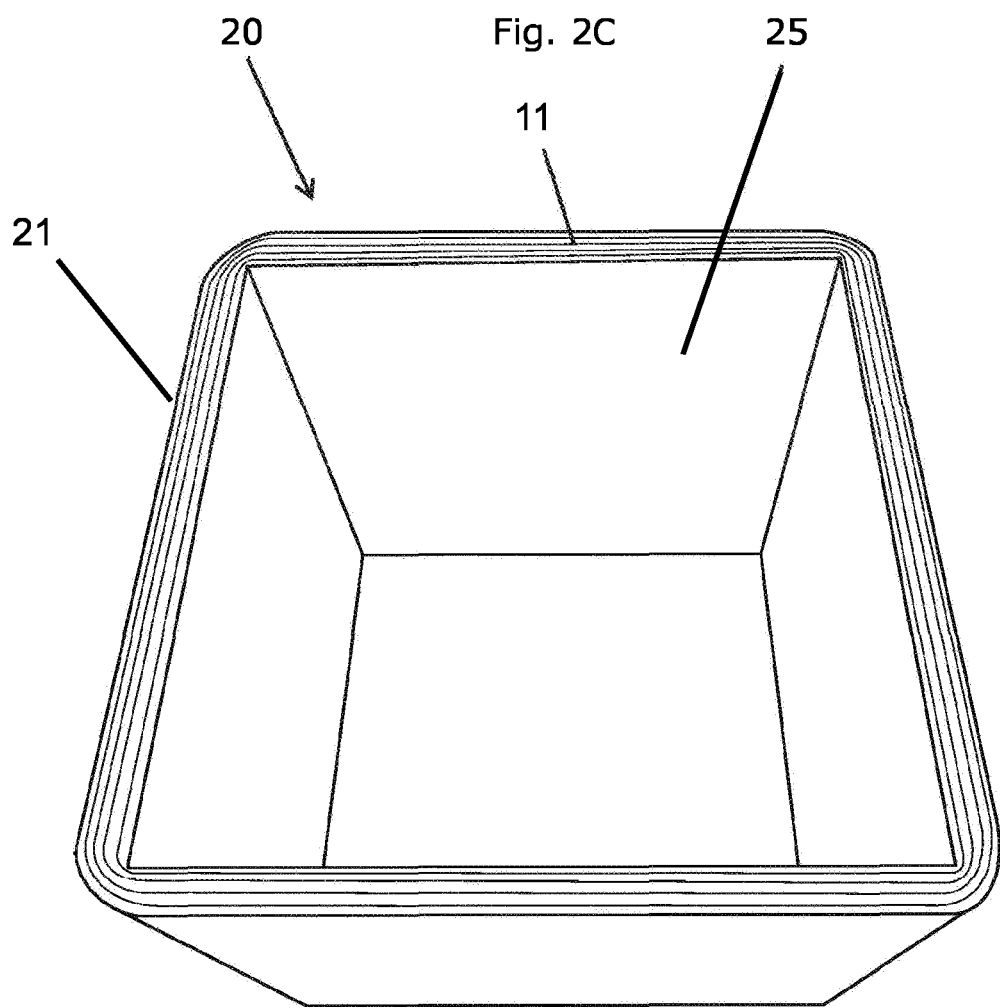
Figure 2D:
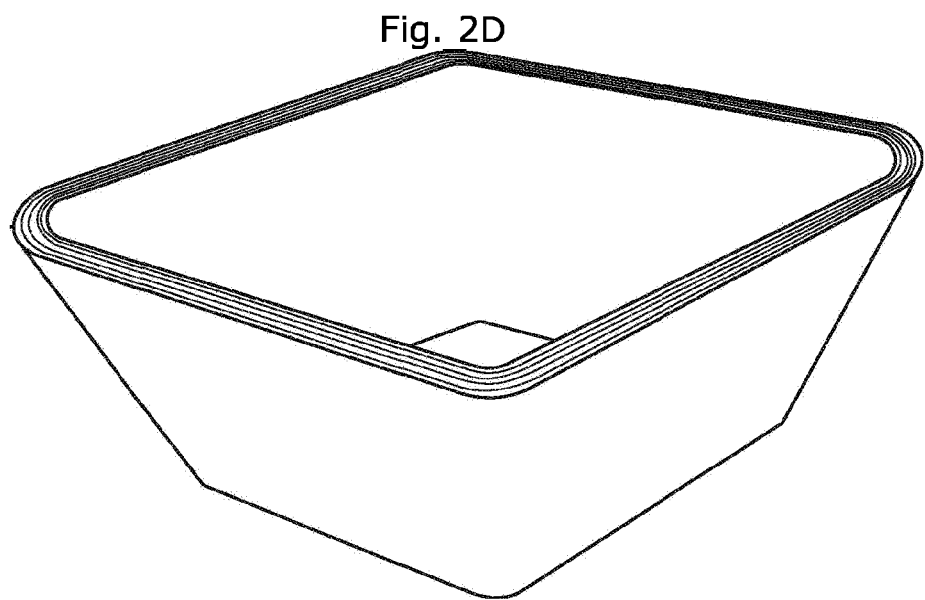

FIG. 2C shows a perspective view of an inside of container 20, with the upper closure element removed. The side wall 20 comprises two elements; an external winding 21 of e-flute single sided corrugated material 11 and a liner 25. The single sided (single faced) corrugated material 11 is presented with the flutes directed inwardly, so as to present a smooth external surface to the box—however, to provide a smooth-walled interior, which also benefits the seal as between the wall 21 and the respective closure elements 22, 23, the liner 25 is provided, the liner conveniently being formed from double faced corrugated cardboard, although it could be a simple card, paper/card-based or otherwise. The liner 25 is folded so as to provide a continuous inner circumferential wall that is smooth. FIG. 2D, in contrast, shows the windings without the liner in a semi-collapsed state. It will be realised that the windings can be reduced in width across a diagonal, to assist in flat-pack storage prior to assembly, or after use can be disassembled, for example. Equally, the winding 21 of the single sided corrugated material 11 could be arranged such that the flutes are directed outwardly. It will be appreciated that an external sheet or sleeve could be placed around the container and a cardboard or plastics liner 25 formed or folded be placed inside.

The manufacture of winding shall now be described with reference to a rectangular cross-sectional box. A rectangular former having a length corresponding to half of an inside perimeter of the container when completed and a width in correspondence with an axial length of the container is wrapped with the corrugate material, with the axis of the flutes parallel with the axial length of the container. At least an initial edge of the corrugate material is fastened to the next adjacent layer, conveniently by adhesive, although other fastening means can be utilised, such as threaded means, stapling etc, noting that it is desired not to have any thermal conductive discontinuity arising therefrom. Once sufficient windings have been wound around the former, the trailing edge of the winding can be fastened to the most adjacent inner winding. The former can then be removed. In the construction of the container, a liner board, conveniently of double-sided corrugate sheet, folded in half, with pre-creased second and third corners is placed within the winding. The diametrically opposite initial fold and two adjacent edges of the liner can then be brought together to define a rectangular plan load volume. In so doing, it will be noted that as the diametrically opposite folds of the flat-pack windings become loose, the windings about the newly formed further corners become taut, which together with the liner and or the end caps/bungs/closures define a rigid container body. Whilst this technique applies simply to containers having an even number of sides, it may prove more difficult to so the same where there is an odd number of sides, although a former of the desired shape of reduced dimension will allow a liner to place the corners in compression when the liner is unfolded to the correct shape.

In a further variation, a specific type of double sided (double faced) corrugated board could be utilised, of the type referred to a "test" board. In such an instance, a test variant of corrugate material can be utilised, given the reduced weight and strength of the paper of the "test side" of the corrugate material is more easily folded, the "test side" of the corrugated board being inwardly directed relative to a winding direction, whereby the less rigid nature of the test corrugate sheet is employed to advantage, whereby to limit transfer of heat by convection within a corrugate flute/channel as such. Equally specialized board having a comb-like profile could also be employed.

FIG. 3A shows an initial inside start winding portion side edge 31 of the single sided corrugated winding 11. The flutes of the corrugated material conveniently face inwardly, a liner 25 is employed and, with reference to FIG. 3B an inside axial edge 31 of the liner is fastened by way of tape 32 to an edge 33 of the liner 25, the edge 33 being coaxial with the tubular walls. The tape shown is a plastics tape, but a paper tape, conveniently with cellulose glue, or, simply adhesive can be employed. In the alternative, cut outs and corresponding interlocking tongues along the edges of the material could be used to close the liner without adhesive or tape. This figure also demonstrates how the insert liner 25 can be removed, for a four-sided liner formed from an elongate, thrice creased rectangular sheet, wherein the two end sides are separated about the corner where they are arranged, conveniently being secured with tape, glue or other securing means. With reference to FIG. 3C, it will be appreciated that the leading and trailing edges that are placed adjacent each other can have locating edge keys to assist in placement one with respect to another when attached. A liner 25 made from cardboard can provide rigidity to a container made in accordance with the invention, whereby an outer box is not necessarily required. In the construction of the central part of the container, the windings are conveniently wrapped around a former, with the outside wall of an initial edge of the corrugate material being glued or otherwise attached to an inside wall of a second layer of winding. It has been found that 4-6 windings of corrugate material are employed for transport of substantially isothermal transport and storage. However, there is a wide range of corrugate material as discussed above and it has been found that three to thirty layers of corrugate material covers a wide range of expected of transport and storage situations, although it is recommended that five to twenty layers of corrugate material winding will cover most expected needs. For example, the typical container assembly will be placed in a box as shall be described below, but it is also possible to use the unexpected rigidity of the insert liner to benefit in a low cost container assembly, where a thin film wrap can be applied about the windings which can also ensure that end closures, conveniently in the form of plugs, are retained in an abutting relationship with the axial end faces of the windings, noting that, the cylindrical walls of the windings could be arranged so that a base plug has a first shape and a top plug at the opposite end is of a different shape, or even crimped and sealed, without any separate plug portion.

Figure 4A:
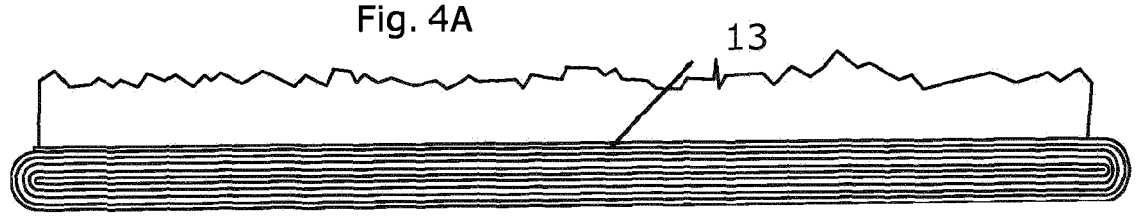
FIG. 4A-4G exemplify further aspect of the invention.
Figure 4B:
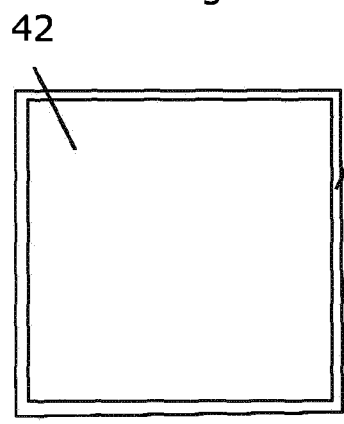
Figure 4C:
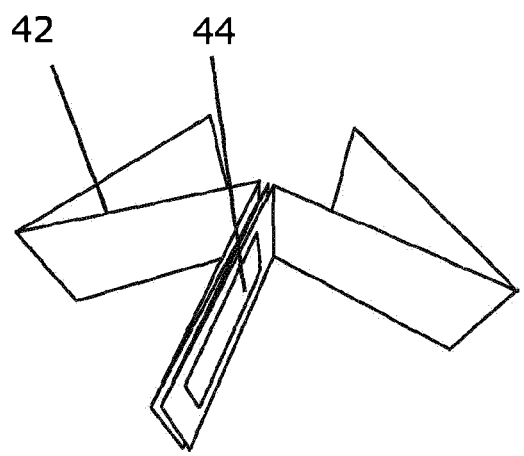
Figure 4D:
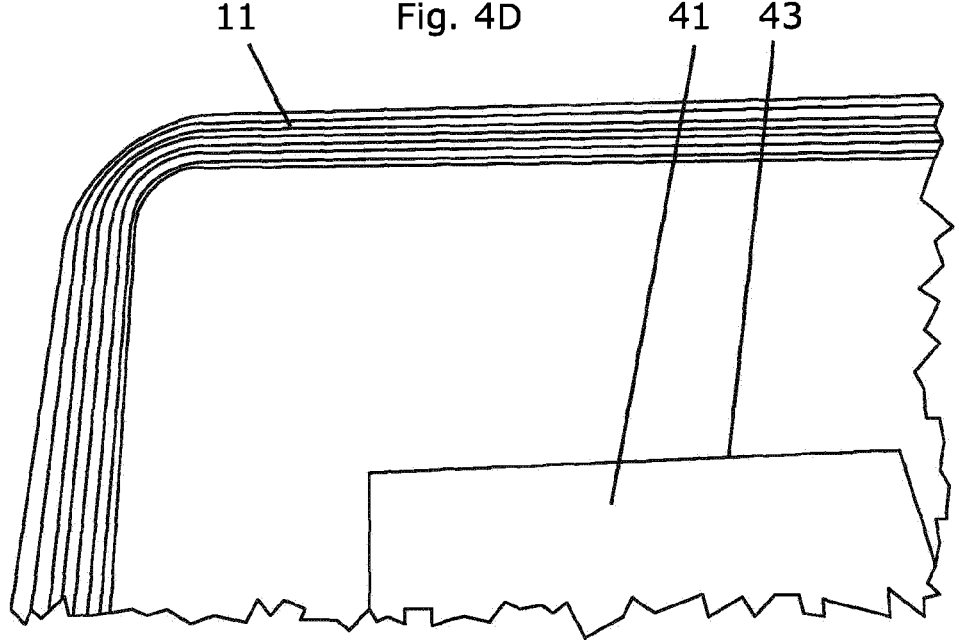

FIG. 4A shows a side view of an external part 41 of a closure element or bung 13. It can clearly be seen that the external part of the closure bung 41 comprises a number of spiral windings of corrugate material, arranged about a stiff central card member, acting as a former, noting that the former can be removed, but the layers would need to be adhesively fastened to prevent separation and/or relative movement therebetween, once the end creases have been formed. FIG. 4B is a plan view of the closure bung, showing the internal part of the closure bung with a reduced plan size (corresponding to an inside section of the aperture defined by the tubular member with which it is engaged, in use). This particular image shows the external part 41 and internal part 42 of the closure bung placed one atop the other prior to securement with glue and are not in actual alignment. It will be appreciated that making the closure bung in the same fashion as the tubular wall enables efficiencies to be made in sourcing, manufacture and disposal. Notwithstanding this, it will be appreciated that the closure elements can be manufactured by die-cut procedures as are well known. FIG. 4C shows how an inside closure bung 42 is formed as a "z-fold" from six sheets of corrugate material—which can be double-sided cardboard, with edge features defined by way of a crease in the cardboard, to permit simple folding. The central two portions (third and fourth) sides define a window-frame effect into which a temperature sensing/data recording element can be placed, to assist in temperature tracking and control, once assembled and in use. FIG. 4D shows a plan view which includes an aspect of a tubular side wall, the corrugated material 11, looking towards a closed end, with an internal face 41 of the closure elements being visible. It has been found that the placement of a crepe paper can assist in sealing any gap 43 that may present itself as between the closure bung and the inside of the corrugated material 11 of the tubular wall.

Figure 4E:
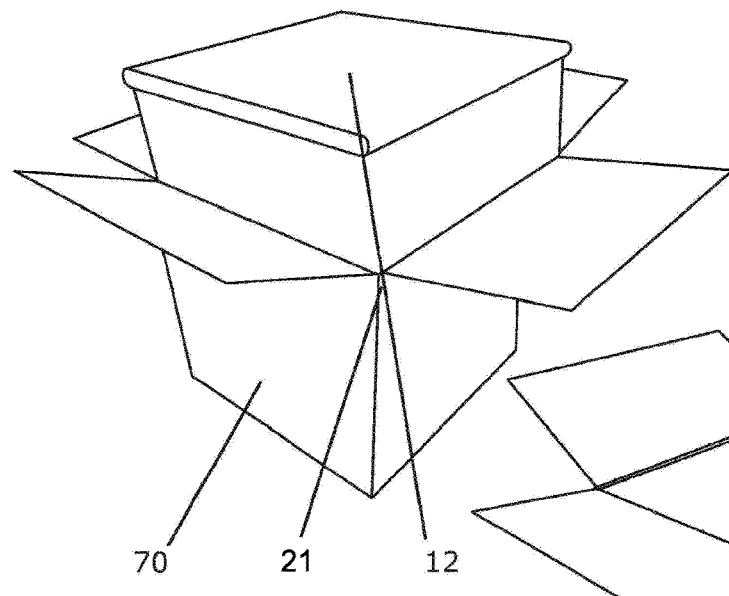
Figure 4F:
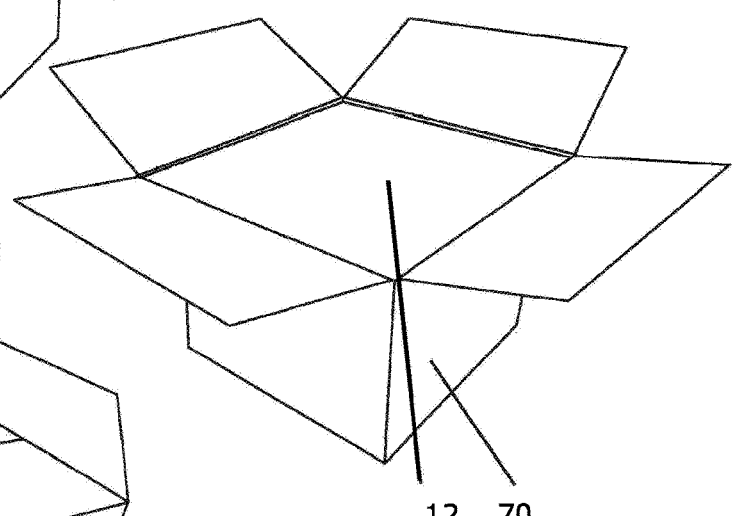
Figure 4G:
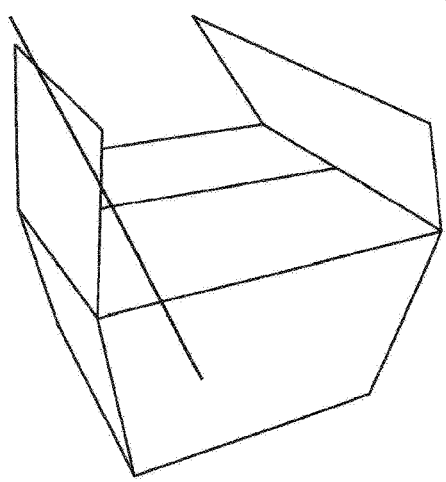

With reference to FIGS. 4E-4G show how, rather than using tape about the first and second closure bungs with respect to the walls, the components of the container are shown being placed within another container box 70, such as a cardboard box of appropriate dimension to ensure that the height of the walls together with the height of the two bungs (noting that only upper bung 12 is shown) correspond to an internal depth as provided by the container box 70. This method of enclosure will provide benefits in longevity of the container, since tape will not need to be applied, released etc. to the primary thermal and shock insulating components, inevitably damaging the components. By having an external box, then the external box will act as a protective enclosure and can also be provided with plastic wrapping, be formed from plastics or be provided with waterproof card etc. to provide an extremely robust yet relatively easy and economically to produce container. As has been referred to generally, above, what is important is that the thickness of the walls determines the efficacy of the containers as a thermally insulating container, noting that if the walls comprise a thickness of ten layers of single sided corrugated material, then the bungs can similarly so sized, whereby to provide an easily scalable insulation index for a given type of corrugated material.

Figure 5:
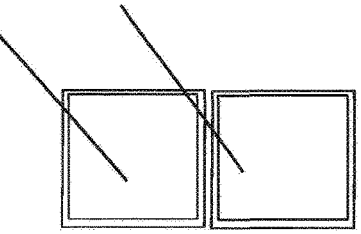
FIG. 5 shows the three components of the container in a flat-pack arrangement.
Figure 5:
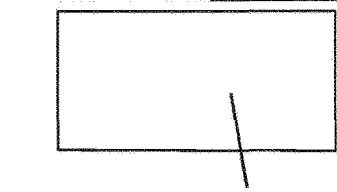

FIG. 5 shows the three components, namely the tubular wall member 21 prior to association with any closure element, together with first and second closure devices/bungs 12, 13 required to make the basic container structure in a flattened arrangement. Importantly, this figure shows that, prior to use, the structures can take little space relative to the volume for transport or storage these containers can ultimately provide. Whilst this embodiment relates to a tubular container of a square plan section, it will be appreciated that the shape could be rectangular, triangular, circular, oval or some other polygon.

Figure 6A:
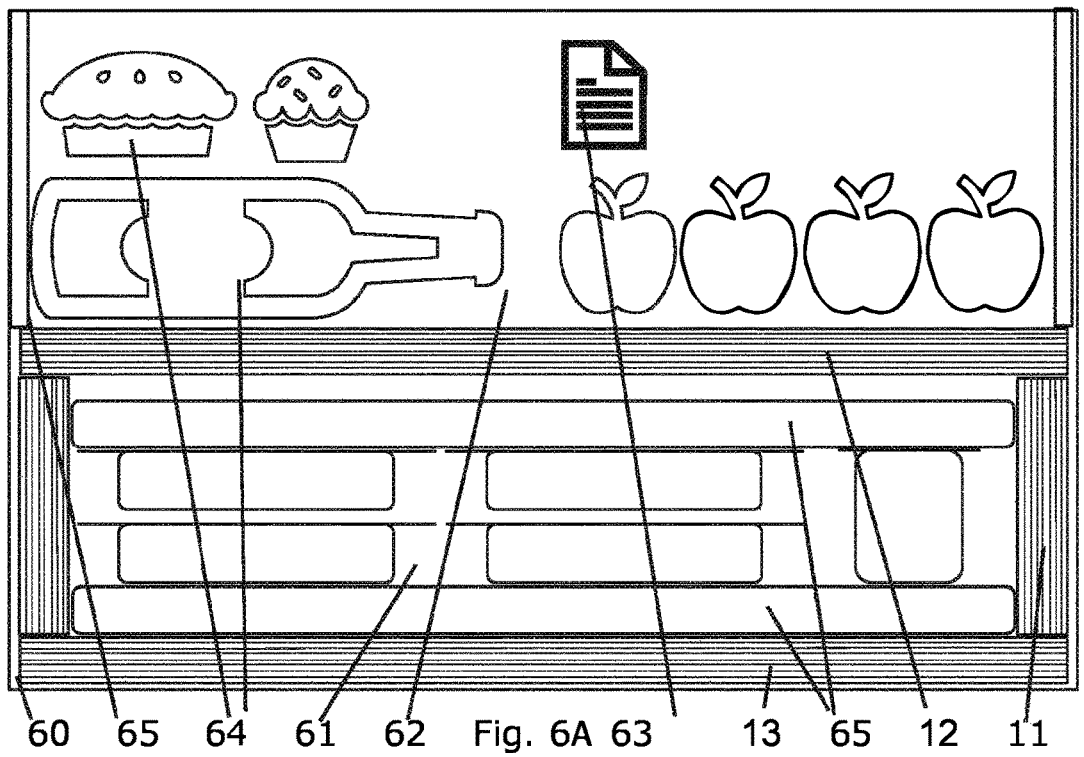
FIGS. 6A-6D show a cross-section, temperature profile and perspective views of a second embodiment of the invention.
Figure 6B:
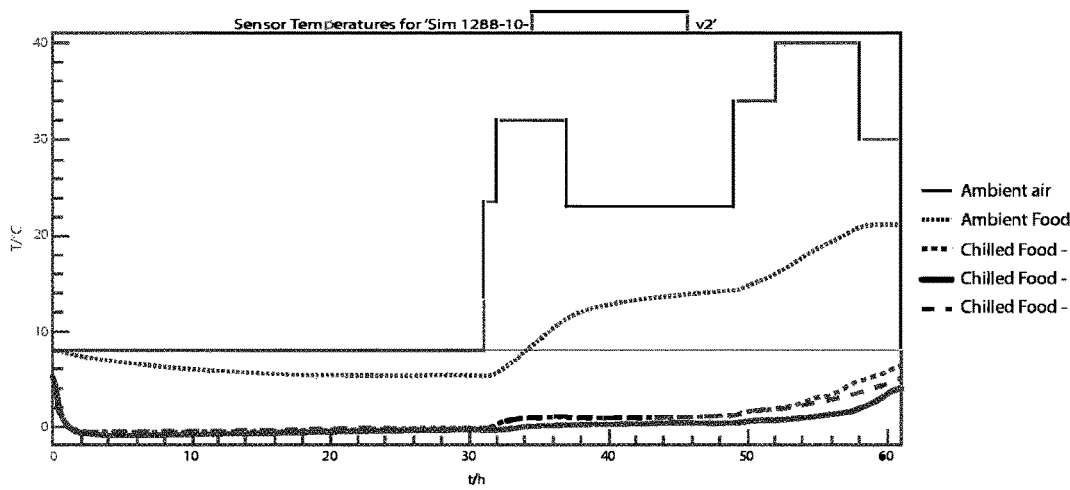

FIG. 6A shows a cross section of a second embodiment of the invention wherein the container assembly comprises a box 60 such as a door-step delivery box for food preparation or an internet grocery delivery box. A multi-layer corrugate base 13 is provided upon which a coil of corrugate sheet is arranged. Instructions 63 to prepare a meal from ingredients provided can be supplied for a meal package delivery in an ambient temperature chamber 62, along with goods 64 to be maintained at ambient temperature. Inside the lower compartment, capped by a lid 12, and arrange to closely fit with respect to the upper edge of the coiled walls of corrugated material 11, as do the lower edges of the walls with respect to the upper surface of the base insulating support, noting that the base and the lid are in intimate contact with the upper edge noting that the lid 12 could be urged downwardly by an optional frame member 65, a ratchet tab (not shown) associated with a wall of the box 60, conveniently by a die-board cut upon formation of the box, by good fit or otherwise, for example, the temperature maintained section could be strapped using strapping, adhesive tape. Goods retained within the lower section can be maintained at a temperature distinct from the ambient temperature. Indeed, within the lower section there is a temperature maintaining packages 65, which can include, for example, a phase change material. In this example and with reference to FIG. 6B, there is shown a typical summer ambient profile for continental land mass (the ambient temperature peaks at 38° C.): it can be seen that the chilled food was maintained below 8° C. over a period in excess of 60 hours. It is also noteworthy that the temperature control comprised two packages of 2 Kg ice, which were placed inside the load volume having been taken from a freezer unit at −18° C.

Figures 6C, 6D:
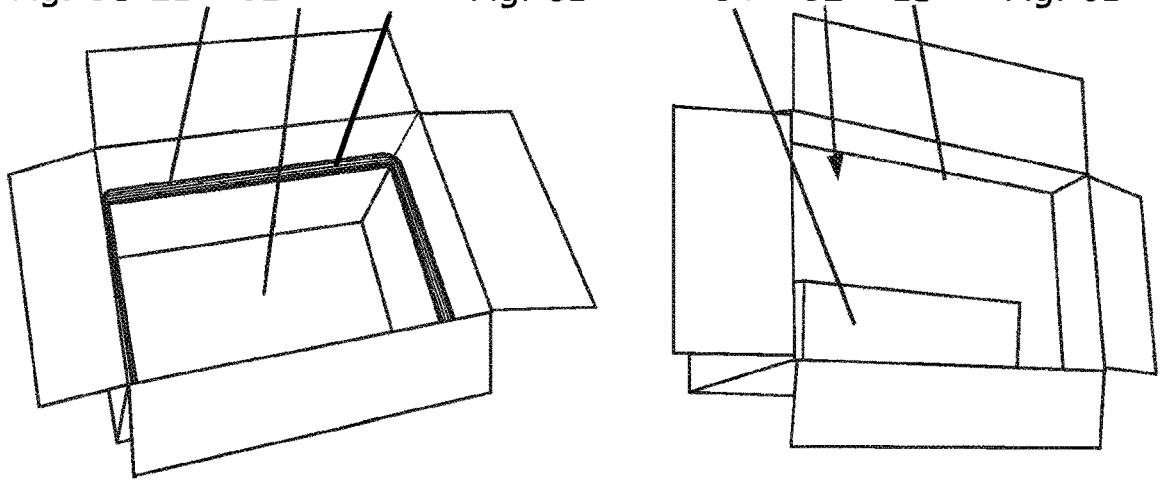
Figure 6E:
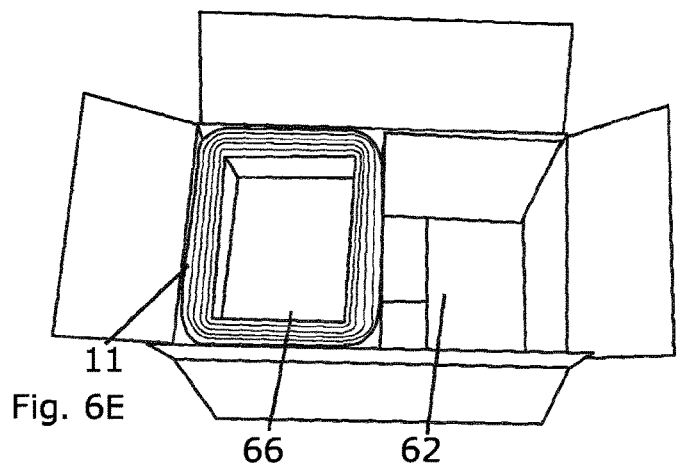
FIGS. 6E-6G show further embodiments of the invention detailing how further compartments can be formed.
Figure 6F:
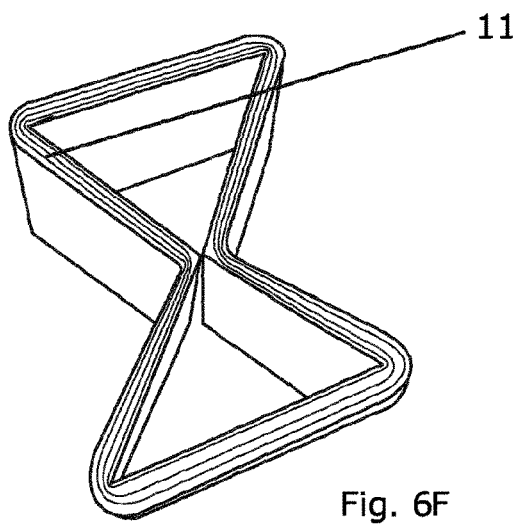
Figure 6G:
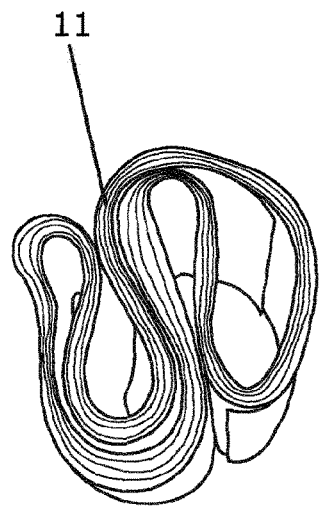
Figure 6H:
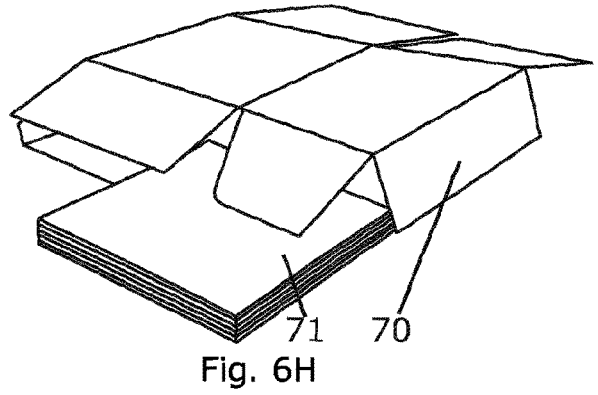
FIGS. 6H & 6I show how a flat-pack box with a coiled corrugate winding can be formed.
Figure 6I:
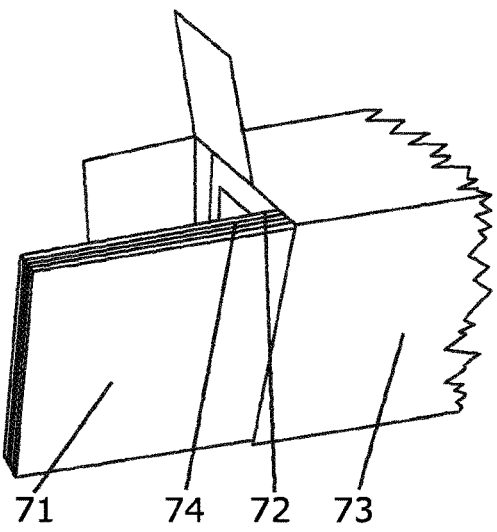

FIG. 6C shows the lower compartment 61 prior to placement of any goods or temperature control packages, with the multilayer corrugate sheet winding 11 forming the tubular wall 21 clearly being seen. FIG. 6D shows the upper compartment with a single item placed therein, for items to be retained at ambient temperature, noting, nonetheless, that a different temperature range could be maintained by the use of a second multilayer corrugate winding, with an appropriate choice of temperature control packages. FIG. 6E shows a further variation wherein the temperature-controlled zone 61 and ambient zone 62 are arranged in parallel with respect to each other in a vertical orientation, noting that the temperature controlled zone has a closely fitting inside section 66 that can act to prevent displacement of goods when paced inside. FIGS. 6F and 6G show how versatile the invention can be in enabling two or more spaces to be provided within a given volume by appropriate orientation of the coiled corrugate winding 11. FIGS. 6H and 6I show a flat-packed box 70, with lid 71 associated with a winding 72 within the box. FIG. 6I shows how, once the box 73 is formed, a cavity 74 can be defined therein for providing a temperature stable volume, using basic coiled corrugate materials.

Figure 7A:
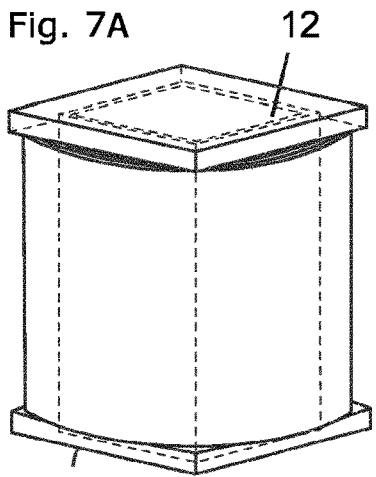
FIGS. 7A and 7B show how the invention can simply reside in a basic winding about a liner.
Figure 7B:
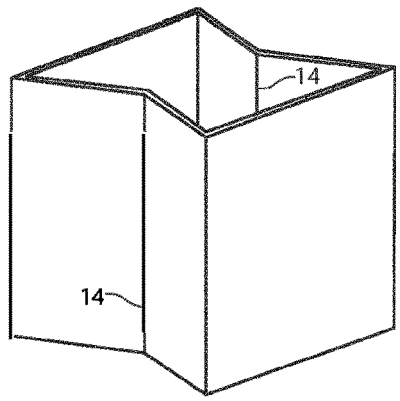
Figure 7C:
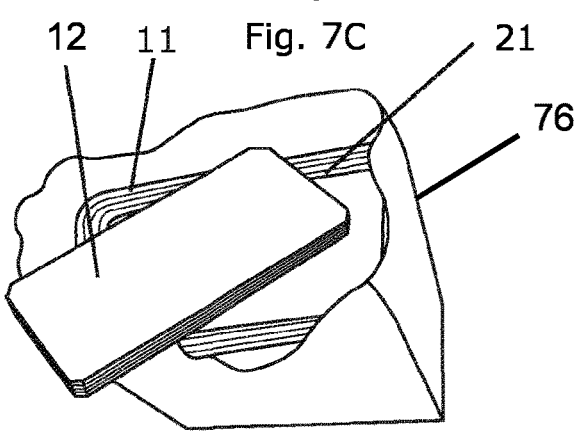
FIGS. 7C-7F show a still further aspect of the invention.
Figure 7D:
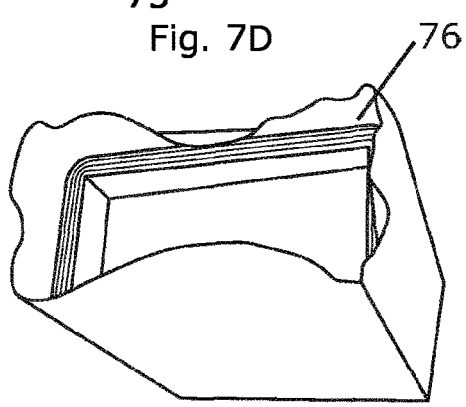
Figure 7E:
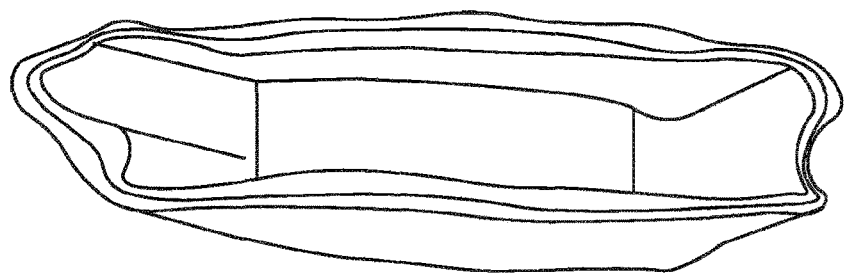
Figure 7F:
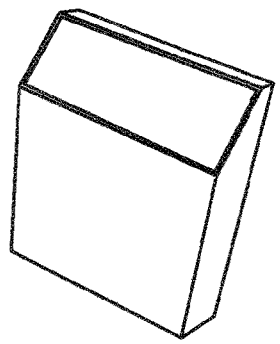

FIGS. 7A and 7B show an alternative configuration of the invention wherein upper and lower closures 12 and 13 are provided with bungs which fit within the tubular walls and wherein, once the basic container per FIG. 7A has been formed, a flat-pack sleeve 75 per FIG. 7B can be arranged around the coil of corrugation provided whereby a further layer of protection is provided, as opposed to, for example, the closure elements being taped, glued, stapled or otherwise secured to the walls or otherwise wrapped with a plastics wrapping film as is widely practiced in the packaging industry. With reference to FIGS. 7C-7F, there are shown still further variants of the present invention. FIG. 7C shows a small brown paper bag 76 which is arranged to closely surround a coiled winding, conveniently with a liner 25. A closure bung 13 (not shown) is placed at the base of the bag and engages with an inside face of the wound corrugate material 11 or lining 25, goods and a temperature control element (if necessary) are placed within and the top of the bag 76 is closed, conveniently with an upper bung or closure 13, per FIG. 7D. Subsequently, one of a number of fastenings means such as adhesive tape, adhesive, mechanical fixing elements or otherwise could be provided to ensure that the upper closure 13 remains within the bag. Equally, it will be appreciated that the upper section of the corrugate material, with reference to FIG. 7E, could be folded over and crimped by means of a spring biased paper fastener such as those sold under the Bulldog (®) brand. It will be appreciated that this type of utilitarian thermal bag can be used in all sorts of scenarios, for going shopping to purchase goods for a freezer, for take-away food outlets, where the low cost of providing thermal insulation will enable food to be maintained at an appropriate temperature for longer. FIG. 7F shows how a small package could be employed for personal medication such as insulin for a diabetic, the low cost of the thermally insulating container providing a reliable method of for the containment of frequently temperature sensitive medication for children and adults alike who wish to escape outdoors, yet need their medication to be available.

It will be appreciated that the present invention can also provide envelope-wallet thermal insulation packages for posting using mail and courier services. These mailing envelopes whilst typically being slightly bigger than standard courier envelopes due to the number of windings of corrugated material will provide significant benefit compared to standard bubble pack envelopes and much more convenient than polystyrene boxes that have otherwise been employed.

In a further configuration, the tube is arranged such that its axis is arranged vertically and a lower section is provided with a greater number of layers of corrugated windings, whereby to provide differing R-values across the axial length of the tube. By having the windings arranged on the inside, the inside section is stepped, which can provide a dividing wall—ideally having a high R-value, conveniently in correspondence with the wall section, whereby to provide two compartments. In a grocery drop-box system, this could be of benefit in that a fresh-food section could be divided from a frozen food section. Appropriate packing of PCM elements could be provided to ensure that a −21° C. could be maintained, with the dividing member being employed to house or otherwise retain a further PCM element or container. It will be appreciated that three or more separate compartments could be provided.

Figure 8:
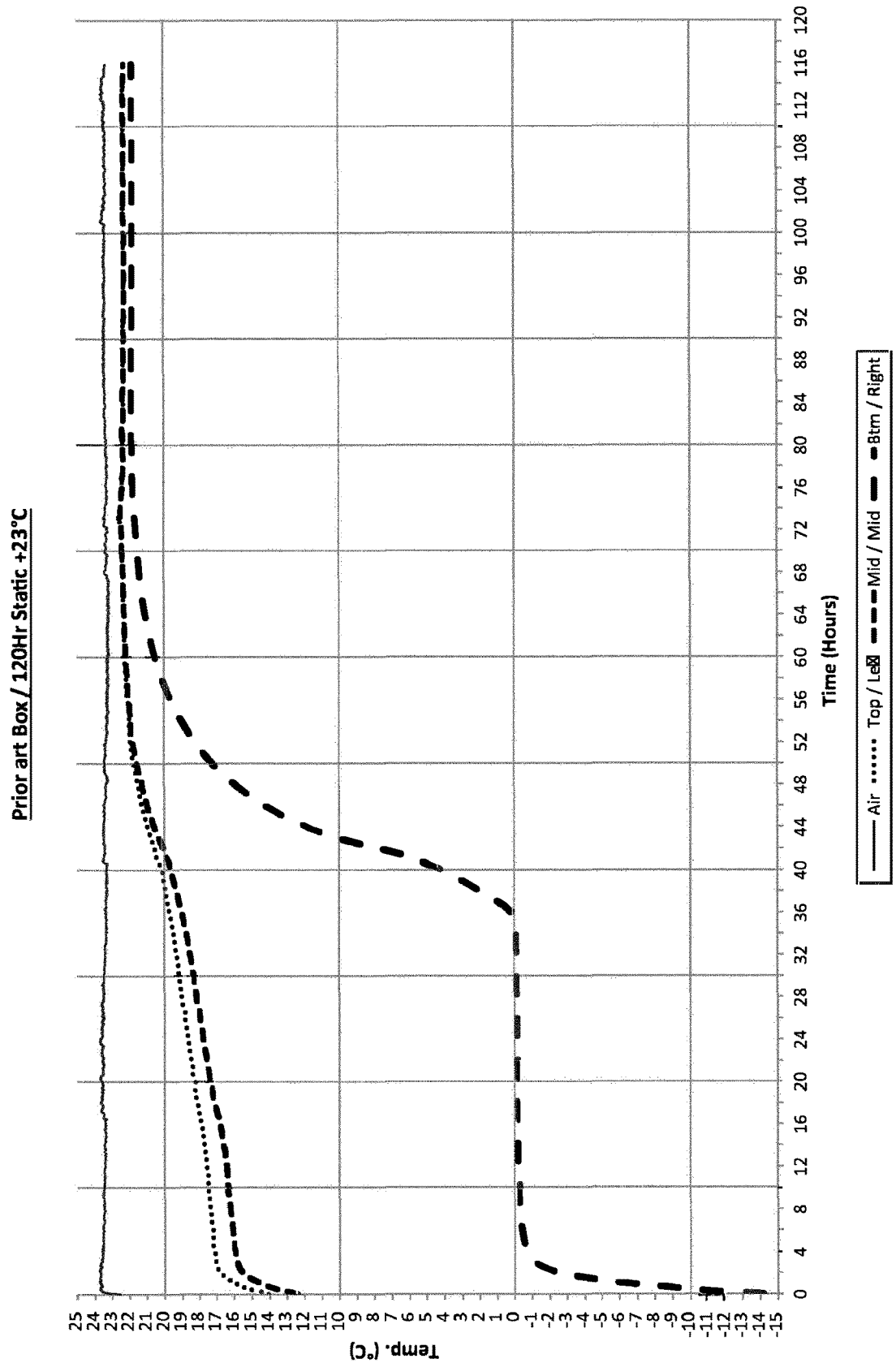
FIGS. 8 and 9 compare the thermal performance over time with respect to known cardboard container and a package in accordance with the invention; and, FIG. 10 compares the thermal performance over time with respect to a known cardboard container and a container in accordance with the invention.
Figure 9:
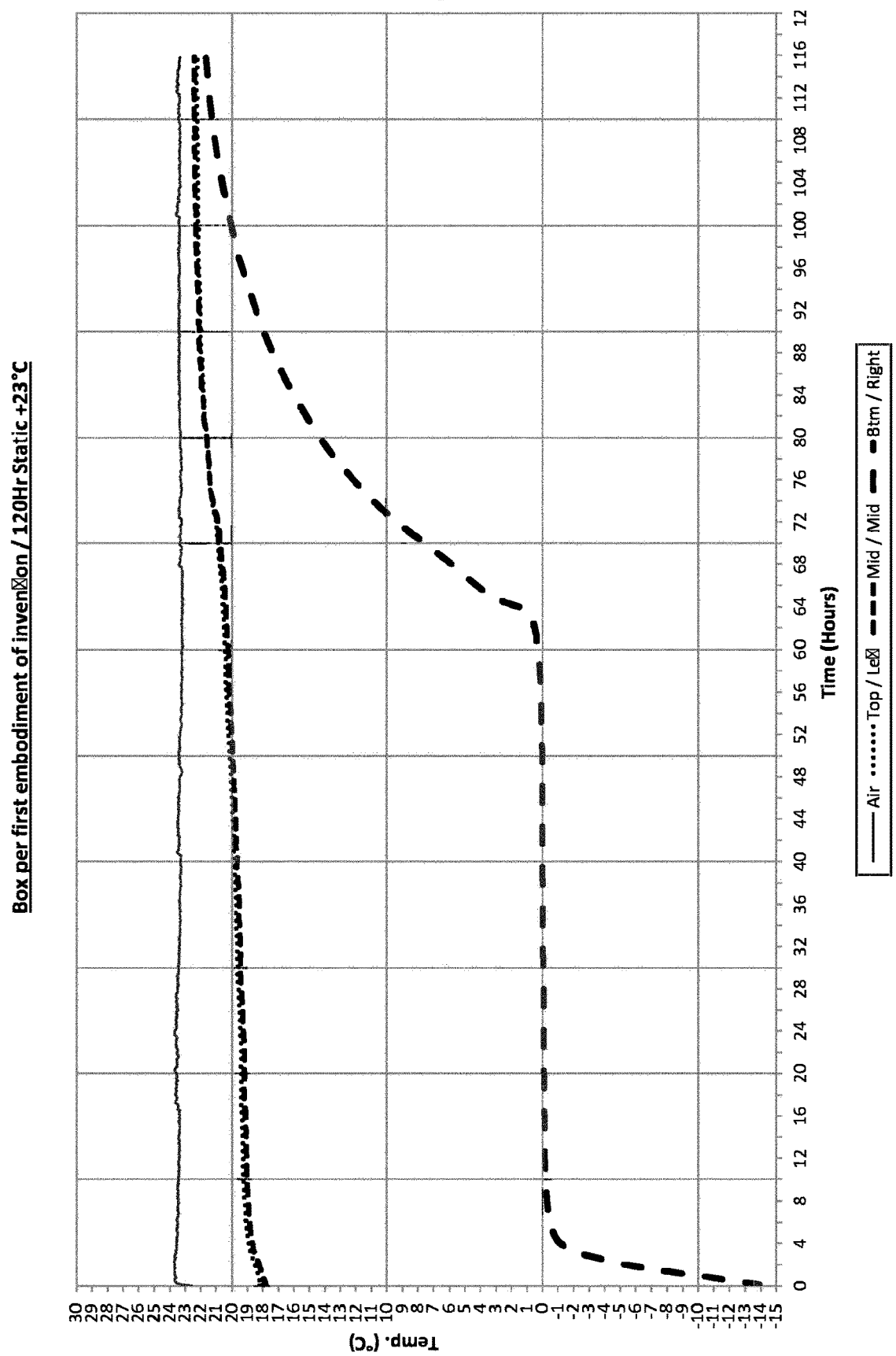

Referring now to FIGS. 8 and 9, Applicant has performed tests in a temperature-controlled chamber which operates at 23° C. as indicated by the red trace. The tests were performed with two similarly sized boxes of dimensions 13.3"×13.5"×14" (h), being standard sized boxes. The prior art box is one which is employed by an internet delivery company. In each box, 1.9 Kg of pre-conditioned ice at −18° C. was placed at the base of the box with an initial temperature of −14° C., with a temperature sensor also placed at the bottom of the box. After approximately 4 hours, the temperature at the inside base of the box had stabilized to a temperature range of −1° C.-+1° C. the temperature sensor arranged at the base of the prior art box continued in this temperature range for 36 hours, with temperature sensors placed diametrically opposite each other at the inside top of the box initially indicating 12° C. and 14° C., respectively and, after 50 hours, indicating the same temperature of 21.5° C. In contrast, the second box, made in accordance with the present invention retained product within the same temperature range for 64 hours, with temperature sensors placed diametrically opposite each other at the inside top of the box each initially indicating 17.5° C. and, after 50 hours, indicating the same temperature of 20° C. With reference to the widely employed +8° C. threshold, the prior art box (FIG. 8) retained the product below that temperature for 42 hours whilst the box in accordance with the present invention (FIG. 9) maintained below this temperature for 72 hours. The flutes as employed in the box of the current invention were dimensioned as B-flutes, having a nominal flute profile of 3 mm.

Figure 10:
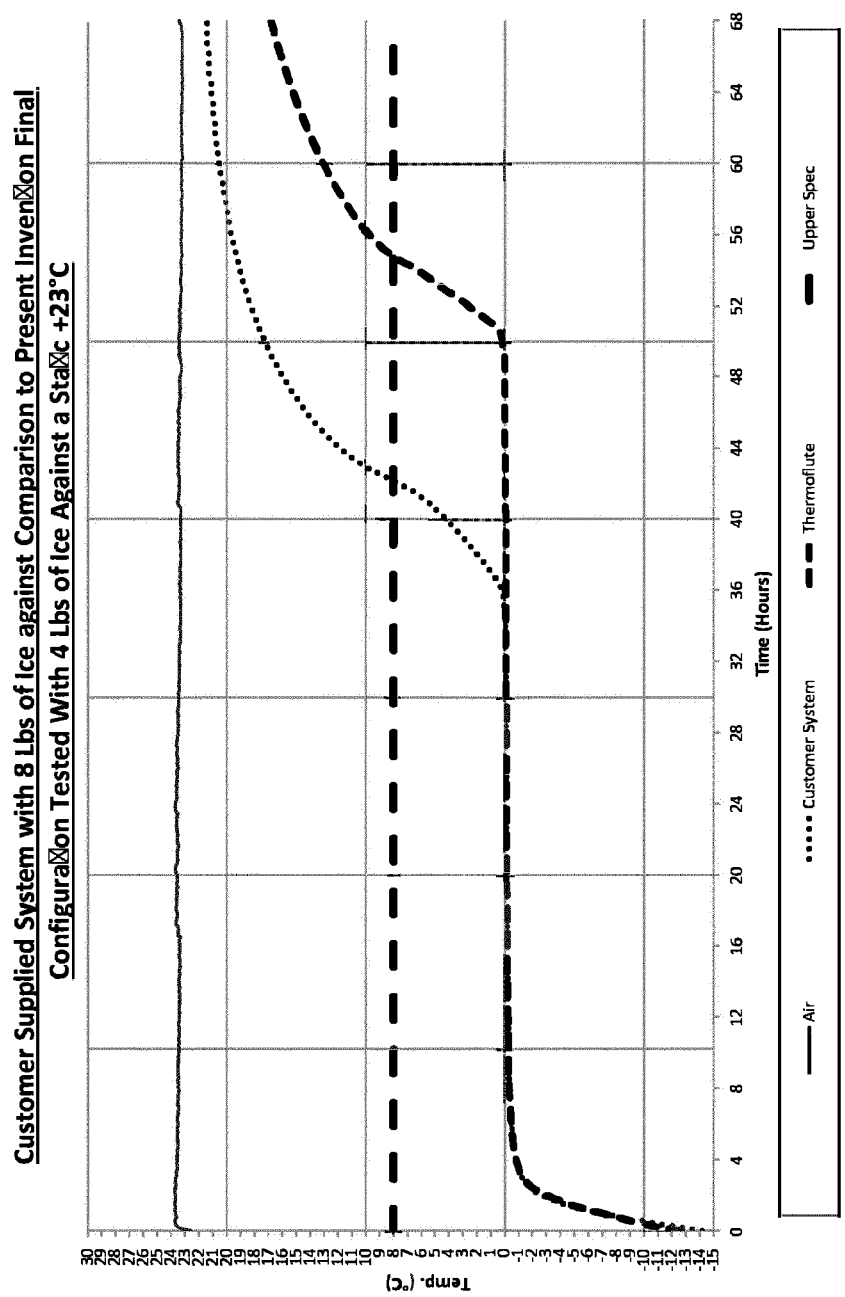

In a second test, 3.6 kg (8 lbs) of pre-conditioned ice at −18° C. was placed in the same first prior art box and in a box made in accordance with the present invention 1.8 kg (4 lbs) of pre-conditioned ice at −18° C. a and placed in an ambient atmosphere of 23° C. As can be seen from FIG. 10, the prior art box broached the upper, 8° C. temperature barrier shortly after 42 hours while the sample box in accordance with the invention broached the 8 temperature barrier in excess of 54 hours of testing. The tests were performed using industry standard temperature data logger monitoring technology, namely a TempTale®4, as produced by Sensitech Inc., a unit of United Technologies Corp. It will be noted that the temperature monitor is packaged with the product and, having a thermal mass takes a period of time to register the correct temperature, given that the sensor is placed within the ice and placed on the inside base of the box. Effectively the present invention has significantly increased the duration of time that the test load of 1.9 kg of water was maintained below the 8° C. threshold.

There are many types of corrugated board available; most corrugated board is cardboard, but plastics board is also available. Corrugated packaging is a versatile, economic, light, robust, recyclable, practical form of packaging and offers almost unlimited possible combinations of board types, flute sizes, paper weights, adhesive types, treatments and coatings. Corrugated cellulose board is produced by combining various papers together in the form of paper layers. These layers are called liners and fluting (the fluting being formed to create a specific profile). The basic types of corrugated material have different material layers in its construction: Single face (2 layers: one liner, one fluting); Single wall (3 layers: two liners, one fluting). These liners and fluting once assembled give the overall structure better strength than that of each individual layer as the fluting provides a significant increase in rigidity to the structure of the container.

The structural strength of corrugated board is derived from the physical fluting of the corrugations, which are glued with paper board or extruded in the case of plastics board. It is important therefore to consider the flute direction and strength of fluting to use. Additional strength can be added by providing enhanced fluting although whilst strength is improved, heavier fluting can make the flute tips more rigid and thus affect the surface finish especially on large flute profiles—this can influence the appearance of any graphics that can be printed upon an external surface. Several types of flutes are available: typically, single wall corrugated for outer containers will typically incorporate either: A, E, B or C flute.

Corrugated cellulose is a natural, environmentally-friendly material with an unbeatable record for recycling and recovery. Corrugated cellulose is an extremely flexible medium that accommodates a wide range of printing options to fully support the end user requirements. Corrugated cellulose can be printed by Flexographic, litho and silk screen. Additionally, corrugated cellulose can provide a hygroscopic wall, which is of advantage when a cold body increases in temperature and is liable to cause moisture within the enclosed atmosphere to condense; the excess condensation can be absorbed by the cellulose. Corrugated Board is made from papers made up from cellulose fibres, which are virgin or recycled and offers almost unlimited possible combinations of board types, flute sizes, paper weights, adhesive types, treatments and coatings. Most types of "cardboard" are recyclable. Boards that are laminates, wax coated, or treated for wet-strength are often more difficult to recycle. Clean cardboard (i.e. cardboard that has not been subject to chemical coatings) is usually worth recovering, although often the difference between the value it realizes and the cost of recovery has been marginal.

Corrugated plastics are generally provided in the form of extruded polypropylene, whereby to provide a lightweight, rigid plastic sheet that is easy to handle. Polypropylene can be simply printed upon using standard techniques and so an external face of a corrugated carton can provide information and/or bear advertisement for a supplier etc. Polypropylene sheets are generally produced without colouring and will have a white and opaque exterior surface, but pigments can readily be added. Polypropylene has good chemical inertness and good resistance to cracking under stress, is considered as being inert and there are no widely available solvents operable at 20° C. Furthermore, polypropylene is very resistant to mineral and organic products and is neither affected by water solutions of mineral salts, nor by chemical bases and mineral acids at temperatures lower than 60° C., except very strong acids. However, it is not resistant to substances with an oxidizing effect or to certain solvents at elevated temperatures.

By the use of polypropylene for the manufacture of corrugated board, a number of recycling opportunities are available. Polypropylene can be thermally recycled (incinerated) where the heat produced can then be used as substitutes for oil, gas and coal or to generate energy at power plants. The complete combustion of polypropylene with air only produces carbon dioxide and water. At higher temperatures traces of nitrogen oxide can be generated, whilst the incomplete combustion of polypropylene produces soot, carbon dioxide and monoxide, and several carbon, hydrogen and oxygen compounds. Such unburned by-products are also released during the combustion of natural materials such as wood or wool. Polypropylene wastes can easily be recycled by way of mechanical recycling, where waste product is collected, cleaned/separated, milled, melted and extruded in granules in order to be re-injected in other manufacturing processes.

Pharmaceuticals, proteins, biological samples and other temperature sensitive products, including food items, are regularly shipped in containers year round and are subjected to a wide range of temperatures. Though they are shipped in insulated containers and/or climate-controlled environments, the temperature stability of the shipping containers can be significantly improved by applying the techniques of the present invention, whereby to provide a simple solution to the maintenance of temperature profiles for the transport and storage of temperature sensitive products. It will be appreciated that the present invention can also provide envelope-wallet thermal insulation packages for posting using mail and courier services. These mailing envelopes whilst typically being slightly bigger than standard courier envelopes due to the number of windings of corrugated material will provide significant benefit compared to standard bubble pack envelopes and much more convenient than polystyrene boxes that have otherwise been employed.

What is claimed is:

1. An insulating transport/storage container for transporting/storing temperature sensitive materials, the container comprising:
    an outer box;
    a generally tubular wall element defining a load volume between first and second apertures at either end thereof;
    first and second closure elements operable to close the first and second apertures; and,
    wherein the box has sidewalls, a lid, and a base, which defines a container volume when the lid and base are closed;
    wherein the tubular wall element comprises a multiple-layer winding of single-sided corrugated sheet, with the layers coupled together;
    wherein the box is shaped to accommodate the tubular wall element and the first and second closures within the container volume; and,
    wherein, upon securement of the box with the tubular wall element and the first and second closures contained within the container volume, the closure elements are brought together with respect to the tubular wall element at the ends thereof, about mutually contacting areas.

2. An insulating transport/storage container according to claim 1, wherein the securement of the box comprises one or more of: adhesive tape, tensioned straps, shrink-wrap plastics film, and a frame, and is operable to ensure that the closure elements fit closely to/abut with the tubular wall element.

3. An insulating transport/storage container according to claim 1, wherein the box is arranged to provide a further partition within the box to enable transport and storage of products outside of said load volume of the transport/storage container, but inside the box.

4. An insulating transport/storage container according to claim 1, wherein the multiple layers of corrugated sheet are arranged such that, with respect to each set of two successive layers, each subsequent layer is wrapped around a previous layer.

5. An insulating transport/storage container according to claim 1, wherein at least one of the first and second closure elements further defines a plug which is operable to fit in an interference fashion with an inside surface of the respective end of the tubular wall.

6. An insulating transport/storage container according to claim 1, wherein at least one of the first and second closure elements are arranged to closely abut the flutes of the corrugated sheet at the respective first and second ends of the tubular element.

7. An insulating transport/storage container according to claim 1, wherein the external part of at least one closure element is arranged such that it is countersunk with respect to the multiple-layer windings of the tubular wall element of the container.

8. An insulating transport/storage container according to claim 1, wherein a second, outer part of at least one closure element is arranged such that its profile in section extends beyond an external section of the tubular wall element.

9. An insulating transport/storage container according to claim 1, wherein a second, outer part of at least one closure element is arranged such that its axial profile extends beyond the tubular wall element.

10. An insulating transport/storage container according to claim 1, wherein the first and second closure elements are retained in place by virtue of being placed in a container which prevents axial movement of the closure elements with respect to the tubular element.

11. An insulating transport/storage container according to claim 1, wherein the closure elements are retained in place by at least one of: straps arranged around closure elements and the walls, adhesive tape, adhesive or shrink-wrapping, whereby axial movement of the closure elements with respect to the tubular element is prevented.

12. An insulating transport/storage container according to claim 1, wherein the closure elements are formed of a single or multi-layer corrugated sheet.

13. An insulating transport/storage container according to claim 1, wherein the corrugated sheet is cellulose-based wherein layers of sheet and fluted corrugations are glued or otherwise connected to each other.

14. An insulating transport/storage container according to claim 1, wherein the corrugated sheet can be formed of a thermo-plastics material which is manufactured in an extruded form.

15. An insulating transport/storage container according to claim 1, wherein there is further provided a gasket member to ensure complete sealing with the closure members.

16. An insulating transport/storage container according to claim 1, wherein the sectional shape of the tubular member is continuous and is one of a square, other rectangular, circular, oval, triangular and other polygons.

17. An insulating transport/storage container according to claim 1, wherein the sectional shape of the tubular member differs from one axial end to the other and the sectional shape of each axial end is selected from the shapes including: square, other rectangular, circular, oval, triangular and other polygons.

18. An insulating transport/storage container according to claim 1, wherein the multi-layered corrugated sheet tubular wall member has two or more sections along its axial length where the number of layers of corrugated sheet differs, whereby the R-value varies along the axial length.

19. An insulating transport/storage container according to claim 1, wherein the multi-layered corrugated sheet tubular wall member has two or more sections along its axial length where the number of layers of corrugated sheet differs, whereby the R-value varies along the axial length and wherein the additional internal layers of corrugated sheet define a step, whereby an internal division member can be placed.

20. A method of packing a product for shipment employing an insulation transport/storage container in accordance with claim 1, the method comprising the steps of:

winding a single-sided corrugated sheet about a form to create a tubular wall element comprising a load volume;

placing a first closure element into a box, the box having sidewalls, a lid, and a base, which defines a container volume when the lid and base are closed;

placing the tubular wall element into the box on top of the first closure element with a first open end of the tubular wall element touching the first closure element;

placing product within the load volume of the tubular wall element;

placing a second closure element at a second end of the tubular container element, so as to close the load volume of the tubular wall element; and closing and securing the box with the tubular wall element and first and second closures inside, such that the closure elements are brought together with respect to the tubular wall element at the ends thereof, about mutually contacting areas.

* * * * *